(12) United States Patent
Kawamoto et al.

(10) Patent No.: US 11,573,648 B2
(45) Date of Patent: Feb. 7, 2023

(54) INFORMATION PROCESSING APPARATUS AND INFORMATION PROCESSING METHOD TO IDENTIFY GESTURE OPERATION OF A USER

(71) Applicant: SONY CORPORATION, Tokyo (JP)

(72) Inventors: Yohei Kawamoto, Tokyo (JP); Yoshihiro Wakita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 184 days.

(21) Appl. No.: 16/977,873

(22) PCT Filed: Jan. 17, 2019

(86) PCT No.: PCT/JP2019/001191
§ 371 (c)(1),
(2) Date: Jun. 7, 2021

(87) PCT Pub. No.: WO2019/176273
PCT Pub. Date: Sep. 19, 2019

(65) Prior Publication Data
US 2021/0311564 A1    Oct. 7, 2021

(30) Foreign Application Priority Data
Mar. 12, 2018   (JP) .............................. JP2018-043790

(51) Int. Cl.
*G06F 3/03*        (2006.01)
*G06F 3/01*        (2006.01)
(Continued)

(52) U.S. Cl.
CPC ............ *G06F 3/0325* (2013.01); *G06F 3/011* (2013.01); *G06F 3/017* (2013.01); *G06F 3/04842* (2013.01); *G06V 40/28* (2022.01)

(58) Field of Classification Search
None
See application file for complete search history.

(56) References Cited

U.S. PATENT DOCUMENTS

| | | |
|---|---|---|
| 2014/0055352 A1 | 2/2014 | Davis et al. |
| 2015/0043770 A1 | 2/2015 | Chen et al. |
| (Continued) | | |

FOREIGN PATENT DOCUMENTS

| | | |
|---|---|---|
| CN | 105027030 A | 11/2015 |
| CN | 109799900 A | 5/2019 |
| (Continued) | | |

OTHER PUBLICATIONS

Partial supplementary European search report of EP Application No. 19768565.4, dated Mar. 26, 2021, 12 pages.
(Continued)

*Primary Examiner* — Amare Mengistu
*Assistant Examiner* — Sarvesh J Nadkarni
(74) *Attorney, Agent, or Firm* — Chip Law Group

(57) ABSTRACT

An information processing apparatus according to an embodiment of the present technology includes a light source section, a detector, and a determination section. The light source section irradiates light onto a body site of a user. The detector includes a plurality of light detectors and outputs a plurality of detection signals on the basis of reflected light that is reflected off the body site. The determination section determines a movement of the user on the basis of information regarding a speckle generated due to the light being irradiated onto the body site, the information regarding a speckle being included in the plurality of detection signals.

19 Claims, 16 Drawing Sheets

(51) Int. Cl.
*G06F 3/04842* (2022.01)
*G06V 40/20* (2022.01)

(56) References Cited

U.S. PATENT DOCUMENTS

| | | | |
|---|---|---|---|
| 2015/0084884 A1* | 3/2015 | Cherradi El Fadili | G06F 3/017 345/173 |
| 2015/0130696 A1* | 5/2015 | Keesling | A61B 5/1071 345/156 |
| 2016/0209929 A1* | 7/2016 | Trisnadi | G06F 3/0304 |
| 2017/0007166 A1* | 1/2017 | Roovers | G01C 22/002 |
| 2017/0347900 A1 | 12/2017 | Nishimura et al. | |
| 2018/0129284 A1 | 5/2018 | Davis et al. | |
| 2018/0293739 A1* | 10/2018 | Gupta | G06V 10/50 |

FOREIGN PATENT DOCUMENTS

| | | |
|---|---|---|
| EP | 2915025 A1 | 9/2015 |
| JP | 2011-186693 A | 9/2011 |
| JP | 2015-041052 A | 3/2015 |
| JP | 2016-150081 A | 8/2016 |
| JP | 6155448 B2 | 7/2017 |
| KR | 10-2015-0099510 A | 8/2015 |
| KR | 10-2017-0003713 A | 1/2017 |
| TW | 201508561 A | 3/2015 |
| WO | 2014/071254 A1 | 5/2014 |
| WO | 2015/021084 A1 | 2/2015 |

OTHER PUBLICATIONS

Fukui, et al., "Hand shape classification with a wrist contour sensor: Development of a prototype device", Proceedings of the 13th international conference on Ubiquitous computing, Sep. 17, 2011, pp. 311-314.

Kenkichi Yamamoto, "Real-time Fingertip Tapping Interface Using High-Speed Vision", Toshiba, Image lab, vol. 18, No. 9, Sep. 1, 2007, pp. 46-51.

International Search Report and Written Opinion of PCT Application No. PCT/JP2019/001191, dated Apr. 2, 2019, 09 pages of ISRWO.

* cited by examiner

| A | Ka | Sa |
|---|----|----|
| Ta | Na | Ha |
| Ma | Ya | Ra |
| ^_^ | Wa_ | ,.?! |

| 7 | 8 | 9 |
|---|---|---|
| 4 | 5 | 6 |
| 1 | 2 | 3 |
| 0 | Del | Ent |

INFORMATION PROCESSING APPARATUS AND INFORMATION PROCESSING METHOD TO IDENTIFY GESTURE OPERATION OF A USER

CROSS REFERENCE TO RELATED APPLICATIONS

This application is a U.S. National Phase of International Patent Application No. PCT/JP2019/001191 filed on Jan. 17, 2019, which claims priority benefit of Japanese Patent Application No. JP 2018-043790 filed in the Japan Patent Office on Mar. 12, 2018. Each of the above-referenced applications is hereby incorporated herein by reference in its entirety.

TECHNICAL FIELD

The present technology relates to an information processing apparatus, an information processing method, and a program that are applicable to, for example, a wearable apparatus.

BACKGROUND ART

Patent Literature 1 discloses a projection system including a wristband terminal and a smartphone. In the projection system, an image is transmitted from a smartphone to a wristband terminal. The transmitted image is projected onto the palm of the hand of a user by a projector included the wristband terminal. This improves the visibility of the image. Further, it is possible to operate various GUIs projected onto the palm of the hand as if operating the smartphone. This results in improving the usability of a mobile terminal (for example, paragraphs [0013] to [0025] in the specification and FIGS. 1A and 1B of Patent Literature 1).

CITATION LIST

Patent Literature

Patent Literature 1: Japanese Patent Application Laid-open No. 2015-41052

DISCLOSURE OF INVENTION

Technical Problem

In the future, various systems using wearable apparatuses and the like are expected to become widespread, and there is a need for a technique capable of achieving a high degree of usability.

In view of the circumstances described above, an object of the present technology is to provide an information processing apparatus, an information processing method, and a program that make it possible to achieve a high degree of usability.

Solution to Problem

In order to achieve the object described above, an information processing apparatus according to an embodiment of the present technology includes a light source section, a detector, and a determination section.

The light source section irradiates light onto a body site of a user.

The detector includes a plurality of light detectors and outputs a plurality of detection signals on the basis of reflected light that is reflected off the body site.

The determination section determines a movement of the user on the basis of information regarding a speckle generated due to the light being irradiated onto the body site, the information regarding a speckle being included in the plurality of detection signals.

In the information processing apparatus, light is irradiated onto a body site of a user, and a plurality of detection signals is output on the basis of its reflected light. Then, a movement of the user is determined on the basis of information regarding a speckle that is included in the plurality of detection signals. This results in being able to achieve a high degree of usability.

The light source section may irradiate laser light onto the body site.

The plurality of light detectors may be a plurality of photodiodes.

The determination section may determine the movement of the user on the basis of a speckle pattern included in the information regarding a speckle.

The determination section may determine the movement of the user on the basis of a time-series change in the speckle pattern.

The determination section may determine the movement of the user on the basis of periodicity of the time-series change in the speckle pattern.

The body site may be a wrist. In this case, the determination section may determine a movement of a hand of the user.

The determination section may determine at least one of which finger is flexed, a flexing amount of the flexed finger, an interaction between fingers, or an interaction between a finger and another object.

The information processing apparatus may further include an execution section that performs a process corresponding to the determined movement.

The execution section may identify an operation input by the user on the basis of the determined movement, and may perform a process corresponding to the identified operation.

The information processing apparatus may further include a history information storage that stores therein history information regarding an operation input by the user in times past. In this case, the execution section may identify an operation input by the user on the basis of the stored history information.

The information processing apparatus may further include a display section that is capable of displaying a specified graphical user interface (GUI). In this case, the execution section may identify an operation that is input into the displayed specified GUI, on the basis of the determined movement.

The execution section may select a plurality of selection candidates selectable by the user, on the basis of the determined movement. In this case, the display section may display a selection image that includes the plurality of selected selection candidates.

The determination section may determine the movement of the user in accordance with a specified learning algorithm.

The information processing apparatus may further include an instruction section and a determination information storage.

The instruction section instructs the user to perform a specified movement.

The determination information storage stores therein determination information that includes the information regarding a speckle, the information regarding a speckle being included in the plurality of detection signals and being information when the user performs the specified movement that has been instructed to be performed.

In this case, the determination section may determine the movement of the user on the basis of the stored determination information.

The information processing apparatus may further include a reception section that receives right-or-wrong information regarding whether a result of the determination performed by the determination section is right. In this case, the determination section may determine the movement of the user on the basis of the received right-or-wrong information.

The detector may include an image sensor. In this case, the plurality of light detectors may be a plurality of pixels of the image sensor.

An information processing apparatus according to another embodiment of the present technology includes a receiver and a determination section.

The receiver receives a plurality of detection signals output on the basis of reflected light that is reflected off a body site of a user due to light being irradiated onto the body site of the user.

The determination section determines a movement of the user on the basis of information regarding a speckle generated due to the light being irradiated onto the body site, the information regarding a speckle being included in the plurality of received detection signals.

An information processing method according to an embodiment of the present technology is a method that is performed by a computer system, and includes receiving a plurality of detection signals output on the basis of reflected light that is reflected off a body site of a user due to light being irradiated onto the body site of the user.

A movement of the user is determined on the basis of information regarding a speckle generated due to the light being irradiated onto the body site, the information regarding a speckle being included in the plurality of received detection signals.

A program according to an embodiment of the present technology causes a computer system to perform a process including:

receiving a plurality of detection signals output on the basis of reflected light that is reflected off a body site of a user due to light being irradiated onto the body site of the user; and determining a movement of the user on the basis of information regarding a speckle generated due to the light being irradiated onto the body site, the information regarding a speckle being included in the plurality of received detection signals.

Advantageous Effects of Invention

As described above, the present technology makes it possible to achieve a high degree of usability. Note that the effect described here is not necessarily limitative, and any of the effects described in the present disclosure may be provided.

MODE(S) FOR CARRYING OUT THE INVENTION

Embodiments according to the present technology will now be described below with reference to the drawings.

Figure 1A:
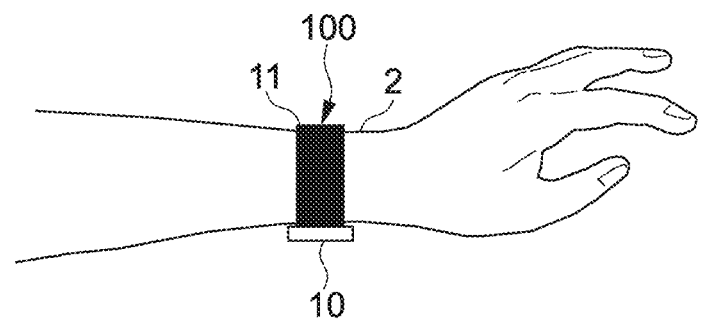
FIGS. 1A and 1B schematically illustrate an appearance of a wearable apparatus according to an embodiment of the present technology.
Figure 1B:
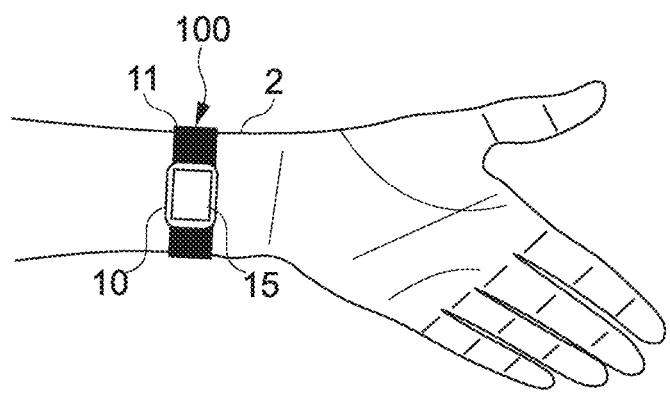

FIGS. 1A and 1B schematically illustrate an appearance of a wearable apparatus according to an embodiment of the present technology. A wearable apparatus 100 is a wristband wearable device, and is used by being worn on a wrist 2 of a user. In the present embodiment, the wearable apparatus 100 corresponds to an embodiment of a recognition apparatus and an information processing apparatus according to the present technology.

The wearable apparatus 100 illustrated in FIGS. 1A and 1B include a main body 10 and an attachment belt 11. The main body 10 is fixed by the attachment belt 11 being wound to be fastened around the wrist 2. In the present embodiment, the wearable apparatus 100 is mounted such that the main body 10 is situated on an inner portion of the wrist 2 (a portion on the palm side of the hand) of the user.

Figure 2:
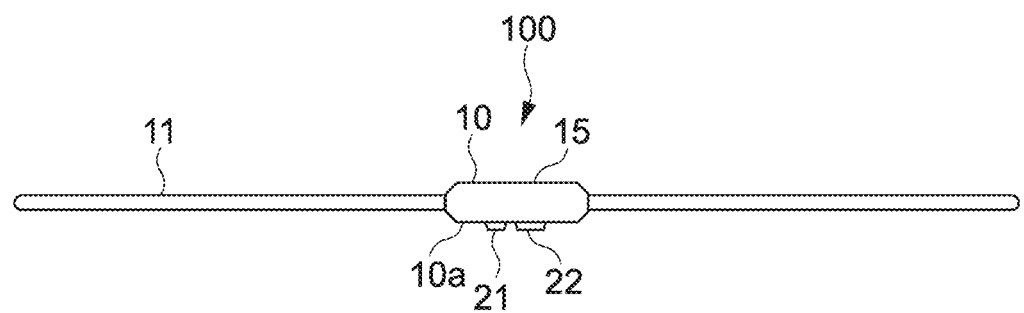
FIG. 2 schematically illustrates the wearable apparatus in a state of not being attached to a user.
Figure 3:
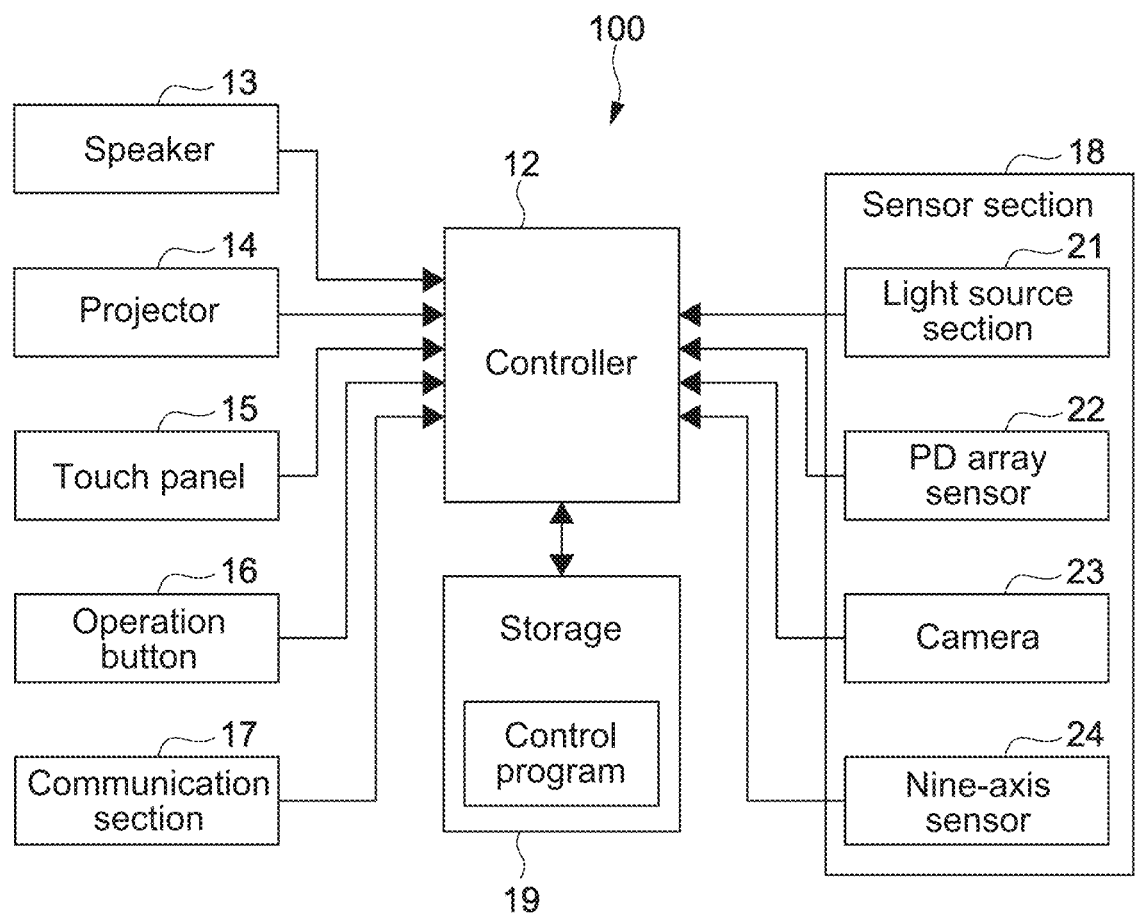
FIG. 3 is a block diagram illustrating an example of a functional configuration of the wearable apparatus.

FIG. 2 schematically illustrates the wearable apparatus in a state of not being attached to a user, as viewed from a lateral side. FIG. 3 is a block diagram illustrating an example of a functional configuration of the wearable apparatus 100.

The wearable apparatus 100 includes a controller 12, a speaker 13, a projector 14, a touch panel 15, an operation button 16, a communication section 17, a sensor section 18, and a storage 19. These blocks are included in the main body 10 of the wearable apparatus 100.

The speaker 13 is capable of outputting sound. The speaker 13 outputs, for example, voice guidance or an alarm sound. The projector 14 is capable of projecting various images and a graphical user interface (GUI). For example, an image and a GUI are projected onto a surface of, for example, a desk or a wall on which the hand of a user is placed. Alternatively, it is also possible to project, for example, an image on the knee of the user or on the palm of the hand of the user.

Various images and a GUI are displayed on the touch panel 15. The user can input, for example, a specified instruction by performing a touch operation on the touch panel 15. The operation button 16 is provided to perform an operation different from the operation performed through the touch panel 15 such as an ON/OFF operation of power supply. In the present embodiment, the projector 14 and the touch panel 15 serve as a display section.

In the present embodiment, it is possible to easily perform an instruction input and the like using a gesture by use of a hand (including, for example, a finger, a joint of a hand, and a back of a hand). In other words, it is possible to perform an input operation (a gesture operation) using a gesture. Of course, a gesture is a concept included in "movement". The input of the gesture operation will be described in detail later.

The communication section 17 is a module used to perform, for example, network communication, Near-Field communication, and infrared communication with another device. For example, a wireless LAN module such as a Wi-Fi, or a communication module such as Bluetooth (registered trademark) is provided. Any infrared communication module may also be used.

The sensor section 18 includes a light source section 21, a photodiode (PD) array sensor 22, a camera 23, and a nine-axis sensor 24. The camera 23 is capable of capturing an image of the periphery of the wearable apparatus 100. The camera 23 makes it possible to, for example, capture an image of the hand or the face of a user.

The nine-axis sensor 24 includes a three-axis acceleration sensor, a three-axis gyroscope, and a three-axis compass sensor. For example, the nine-axis sensor 24 makes it possible to detect acceleration, angular velocity, and azimuth in three axes of the wearable apparatus 100.

As illustrated in FIG. 2, the light source section 21 and the PD array sensor 22 are arranged side by side on a rear surface 10a of the main body 10 (a surface facing a surface of the wrist 2 of a user).

Figure 4:
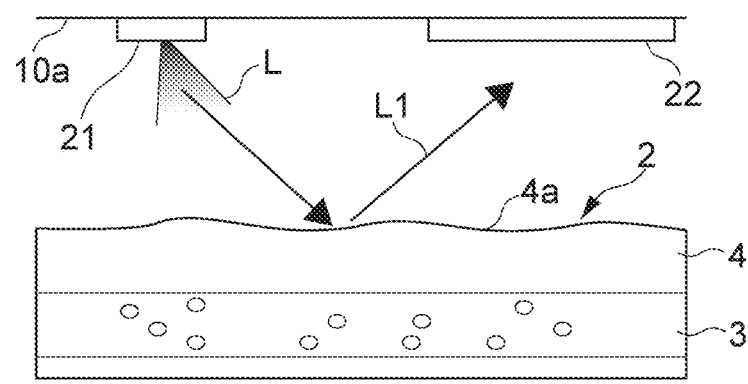
FIG. 4 is a schematic diagram describing an operation of a light source section and a PD array sensor.

The light source section 21 includes a laser light source, and irradiates laser light L onto the wrist 2 of the user (see FIG. 4). The type of laser light source is not limited, and, for example, various laser sources such as a semiconductor laser, a gas laser, a solid-state laser, and a liquid laser may be used. Further, a lens system or the like that is capable of adjusting, for example, a bundle of rays of laser light emitted from a laser light source may be provided as the light source section 21.

Figure 5A:
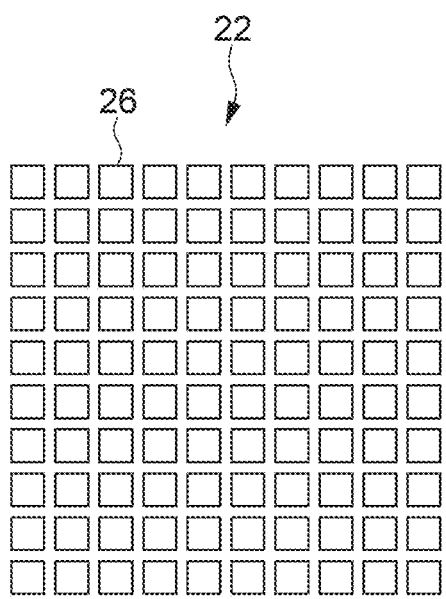
FIGS. 5A and 5B schematically illustrate the PD array sensor.
Figure 5B:
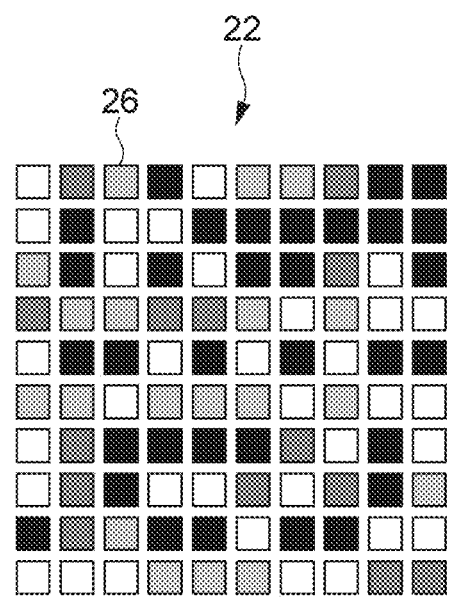

The PD array sensor 22 includes a plurality of two-dimensionally arranged photodiodes (PD) 26 (see FIGS. 5A and 5B). The PD 26 serves as a photodetector, and is capable of outputting a detection signal corresponding to an amount of incident light.

The PD 26 is capable of detecting light at a temporal resolution of several tens of kilohertz, and is capable of detecting a change in an amount of light for a small period of time. In this embodiment, 100 PDs 26 are used, but the number of PDs 26 is not limited, and may be set discretionarily. The specific configuration of the PD 26 is not limited, and may be designed discretionarily.

In the present embodiment, the light source section 21 corresponds to a light source section that irradiates light onto a body site of a user. Further, the wrist 2 is selected as the body site. The PD array sensor 22 corresponds to a detector that includes a plurality of light detectors and outputs a plurality of detection signals on the basis of reflected light L1 (see FIG. 4) that is reflected off the body site (wrist 2). In the present embodiment, the plurality of photodetectors is a plurality of PDs 26, and detection signals output from the plurality of PDs 26 correspond to the plurality of detection signals.

The storage 19 is a nonvolatile storage device, and, for example, a hard disk drive (HDD) is used. The storage 19 stores therein a control program used to control an entire operation of the wearable apparatus 100. Further, training data, history information, and the like that will be described later are stored in the storage 19. The method for installing the control program or the like in the wearable apparatus 100 is not limited.

The controller 12 controls an operation of each block included in the wearable apparatus 100. The controller 12 is configured by hardware, such as a CPU and a memory (a RAM and a ROM), that is necessary for a computer. Various processes are performed by the CPU loading, into the RAM, the control program or the like stored in the storage 19 and executing the control program or the like.

For example, a programmable logic device (PLD) such as a field programmable gate array (FPGA), or other devices such as an application specific integrated circuit (ASIC) may be used as the controller 12.

An outline of a method for identifying a gesture operation according to the present technology will be described with reference to FIGS. 4, 5A, 5B, 6A, 6B, 6C, and 7. FIG. 4 is a schematic diagram describing an operation of the light source section 21 and the PD array sensor 22 that are arranged on the rear surface 10a of the main body 10. FIGS. 5A and 5B schematically illustrate the PD array sensor 22.

FIG. 5A illustrates an example of an arrangement of a plurality of PDs 26, and FIG. 5B schematically illustrates a distribution of the intensity of a detection signal output from a plurality of PDs 26.

FIG. 5 illustrates an example of an arrangement of a plurality of PDs 26, and B of FIG. 5 schematically illustrates a distribution of the intensity of a detection signal output from a plurality of PDs 26.

In this embodiment, the wearable apparatus 100 is worn next to the skin. Accordingly, the light source section 21 and the PD array sensor 22 that are arranged on the rear surface 10a of the main body 10 are arranged to face a skin 4 that covers a blood vessel 3. A narrow gap is provided between the light source section 21 and the PD-array sensor 22 and a surface 4a of the skin 4.

The light source section 21 irradiates the laser light L onto the surface 4a of the skin 4. When coherent light such as the laser light L is irradiated, the laser light L is diffused (scattered) due to a fine unevenness on the surface 4a of the skin 4. Due to interference of the diffused laser light L, a speckle (a spot) is generated, and a speckle pattern including a plurality of speckles is generated. Consequently, a detection signal corresponding to the speckle pattern is output from each PD 26 of the PD array sensor 22.

For example, it is assumed that the intensity of a detection signal of a white PD 26 illustrated in FIG. 5B is highest, and the intensity of a detection signal of a black PD 26 is lowest. Further, the intensity of a detection signal of a gray PD 26 exhibits an intermediate value. Only two types of gray colors are schematically illustrated in FIG. 5B, but, of course, the intensity of a detection signal is not limited to this. A detection signal of an intensity in a range from a minimum value to a maximum value is output according to an amount of incident light.

The distribution of the intensity of a plurality of detection signals output from a plurality of PDs 26 is an intensity distribution corresponding to a generated speckle pattern. In other words, the distribution of the intensity of a plurality of detection signals corresponds to a planar intensity pattern of generated speckles.

The speckle pattern is a pattern corresponding to the shape of the surface 4a of the skin 4, and when the shape of the surface 4a is changed, the speckle pattern is also changed. For example, when a finger is moved, muscles and tendons that are connected to each other from a hand to an arm are moved, and the shape of the surface 4a of the skin 4 is changed. In other words, when a finger is moved, a speckle pattern generated by irradiating the laser light L is changed.

The inventors have paid attention to this point, and have newly found catching the movement of muscles and tendons on the basis of the speckle pattern to determine the movement of a hand focusing on the movement of a finger. In other words, the inventors have newly found determining the movement of a hand according to, for example, a current speckle pattern and a time-series change in a speckle pattern.

As described above, the distribution of the intensity of a plurality of detection signals output from the PD array sensor 22 corresponds to a speckle pattern. Therefore, the analysis of a distribution of the intensity of a plurality of detection signals output from the PD array sensor 22 makes it possible to catch the movement of muscles and tendons and to determine the movement of a hand.

Figure 6A:
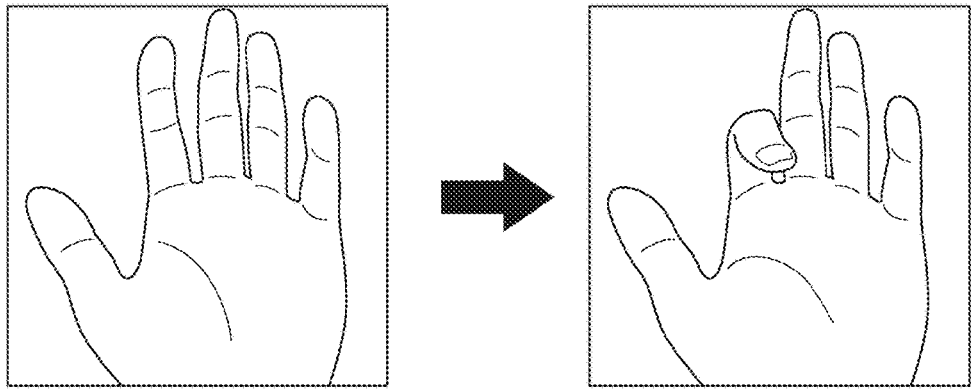
FIGS. 6A, 6B, and 6C schematically illustrate an example of a change in the movement of a hand and a change in a distribution of the intensity of a detection signal.
Figure 6B:
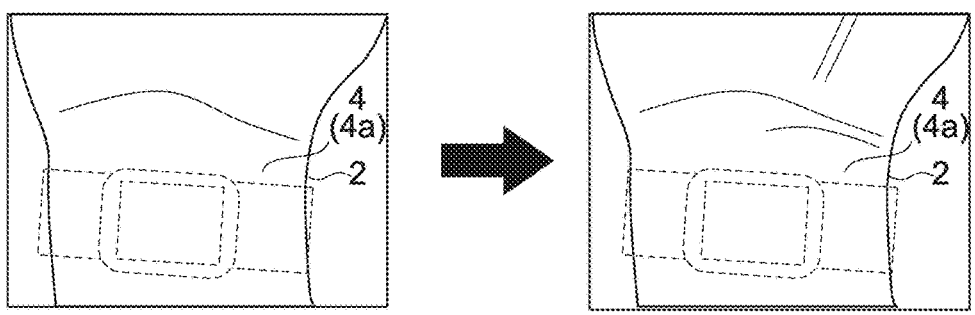
Figure 6C:
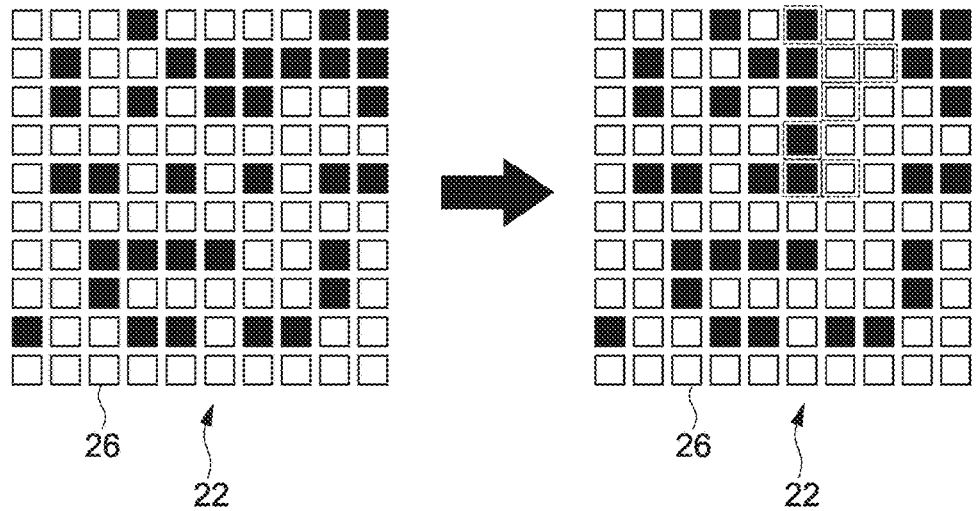

FIGS. 6A, 6B, and 6C schematically illustrate an example of a change in the movement of a hand and a change in a distribution of the intensity of a detection signal. A first finger of a left hand is flexed inward as illustrated in FIG. 6A. Then, as illustrated in FIG. 6B, muscles and tendons that move the finger are deformed, and the surface 4a of the skin 4 covering the muscles and tendons is deformed in the vicinity of the wrists 2. When the surface 4a of the skin 4 is deformed, the speckle pattern upon irradiation of a laser is changed. Accordingly, as illustrated in FIG. 6C, the distribution of the intensity of a plurality of detection signals output from the PD array sensor 22 is changed. Note that FIG. 6C further schematically illustrates the distribution of the intensity of a detection signal.

Which portions of muscles and tendons are deformed, and how the muscles and tendons are deformed vary depending on which finger is flexed and how the finger is flexed (an amount of flexing of a finger, a speed of flexing of the finger, and the like), and thus how a speckle pattern is changed also varies. Therefore, the analysis of a distribution of the intensity of a plurality of detection signals output from the PD array sensor 22 makes it possible to determine which finger is flexed and how the finger is flexed (an amount of flexing of a finger, a speed of flexing of the finger, and the like).

Figure 7:
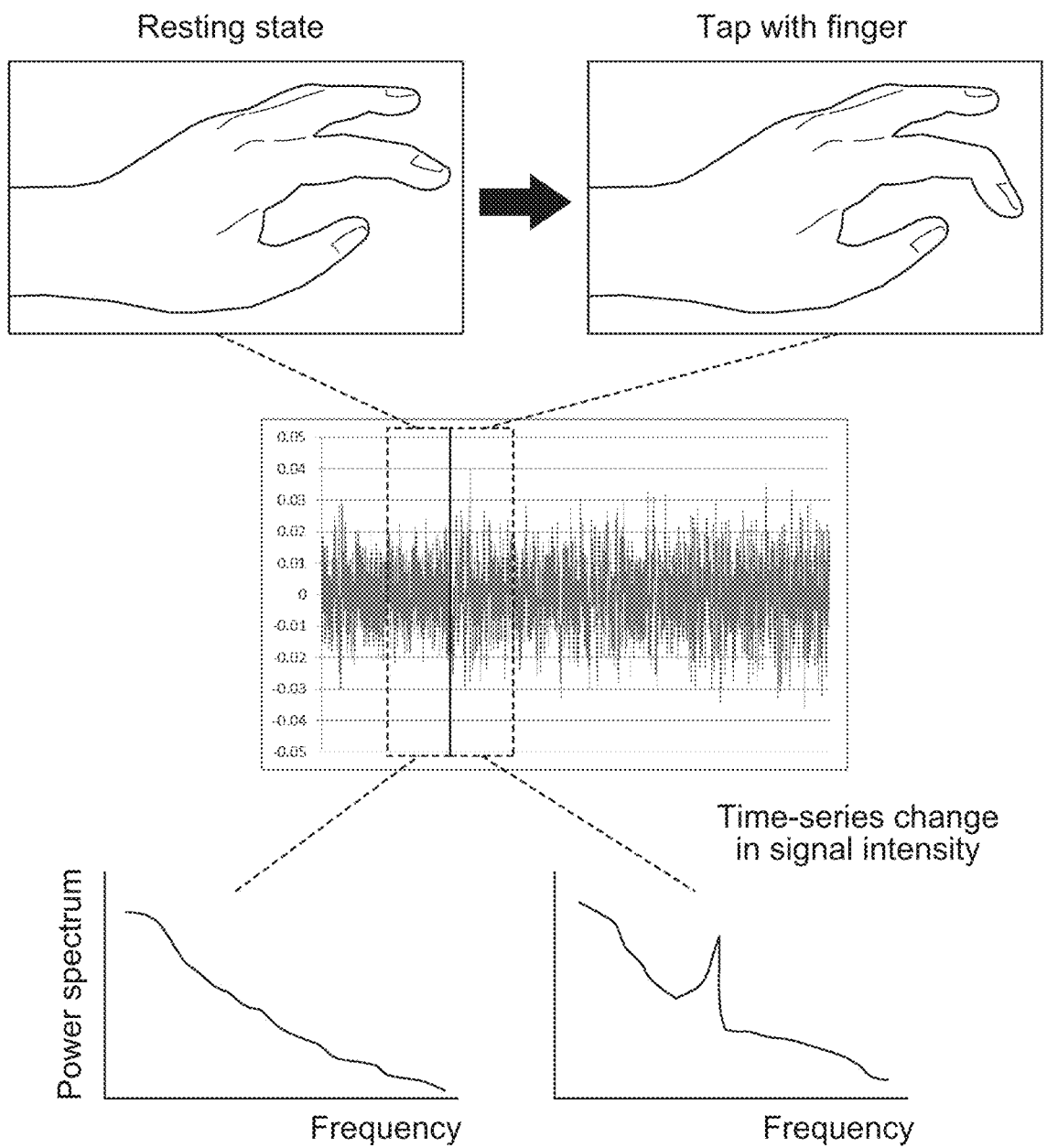
FIG. 7 is a schematic diagram describing determination regarding an interaction between fingers and an interaction between a finger and another object.

FIG. 7 is a schematic diagram describing determination regarding an interaction between fingers and an interaction between a finger and another object. The interaction between fingers includes any interaction such as tapping a finger against a finger (causing two fingers to hit on each other) and rubbing fingers (rubbing fingers together). The interaction between a finger and another object (such as a desk or a wall) includes any interaction such as tapping an object with a finger or rubbing an object with a finger.

When the interaction between fingers or the interaction between a finger and another object occurs, muscles and tendons in a hand vibrate. Depending on the frequency of the vibration (the period of the vibration), the shape of the surface 4a of the skin 4 is changed, and the speckle pattern is changed. For example, when a finger is tapped against a finger to generate sound, muscles and tendons vibrate and the speckle pattern is changed at a frequency equivalent to the frequency of the sound. Of course, it is not limited to this.

For example, the analysis of the periodicity of a time-series change in speckle pattern makes it possible to determine the interaction between fingers or the interaction between a finger and an object. In other words, the analysis of a time-series change in signal intensity schematically illustrated in FIG. 7 makes it possible to determine the interaction between fingers or the interaction between a finger and an object. The analysis of the periodicity of a time-series change includes analysis of any parameters related to the periodicity of a time-series change, such as a shape of a frequency distribution of a time-series change and a peak frequency of a period of the time-series change.

For example, as illustrated in FIG. 7, frequency analysis is respectively performed with respect to a time-series change in signal intensity when the finger is in a resting state, and a time-series change in signal intensity when a desk or the like is tapped with a finger. When power spectra are compared, when a desk or the like is hit with a finger, a peak is reached at a specific frequency. The reason is that muscles and tendons vibrate due to tapping with a finger and thus the surface 4a of the skin 4 also vibrates, and this results in causing vibration due to vibration intensity.

A positional relationship between muscles and tendons and a structure of the muscles and the tendons vary depending on which fingers are caused to interact with each other, a degree of flexing when the fingers are caused to interact (such as an amount of flexing), a speed of the interaction, which finger is caused to act on an object, a degree of flexing when the finger is caused to act on the object, a speed of the action, and the like. Therefore, the frequency of vibration of the muscles and tendons varies, and the frequency, the peak frequency, the shape of a frequency distribution, and the like of a time-series change in a speckle pattern (signal intensity) also vary.

Therefore, the analysis of the periodicity of a time-series change in signal intensity makes it possible to determine which fingers are caused to interact with each other, a degree of flexing when the fingers are caused to interact (such as an amount of flexing), a speed of the interaction, which finger is caused to act on an object, a degree of flexing when the finger is caused to act on the object, a speed of the action, and the like.

As described above, the present embodiment makes it possible to determine how a user has moved his/her hand and what gesture the user has made. It is also possible to identify what operation has been input using the gesture. In other words, it is possible to identify, with a high degree of accuracy, a gesture operation performed by a user. The identifying an operation can also be referred to as estimating an operation.

In the present embodiment, a distribution of the intensity of a detection signal output from the PD array sensor 22, a time-series change in the intensity of the detection signal, the periodicity of the time-series change (such as the frequency of the time-series change and the peak frequency of a period of the time-series change) are included in "information regarding a speckle generated due to light being irradiated onto a body site, the information being included in a plurality of detection signals". The information regarding a speckle includes any information regarding a generated speckle, and includes, for example, a spatial speckle pattern feature and a time-series feature that can be detected from a detection signal. The intensity of a detection signal itself is also included in the information regarding a speckle since the intensity of a detection signal itself is determined according to a speckle.

In the present embodiment, determination of the user's movement that is performed on the basis of a distribution of the intensity of a plurality of detection signals is included in determination of the user's movement that is performed on the basis of a speckle pattern. Determination of the user's movement that is performed on the basis of a time-series change in a plurality of detection signals is included in determination of the user's movement that is performed on the basis of a time-series change in a speckle pattern. Further, determination of the user's movement that is performed on the basis of the periodicity of a time-series change in a plurality of detection signals is included in determination of the user's movement that is performed on the basis of the periodicity of a time-series change in a speckle pattern.

Note that, with respect to the determination based on a time-series change, the determination may be performed on the basis of a time-series change in some detection signals from among a plurality of detection signals. In other words, the determination based on a time-series change in a speckle pattern (the peak frequency of the time-series change) includes determination based on a time-series change in some detection signals from among the plurality of detection signals (the peak frequency of the time-series change). In some cases, the determination of the movement of a user is performed by focusing on a detection signal of a single PD 26.

Figure 8:
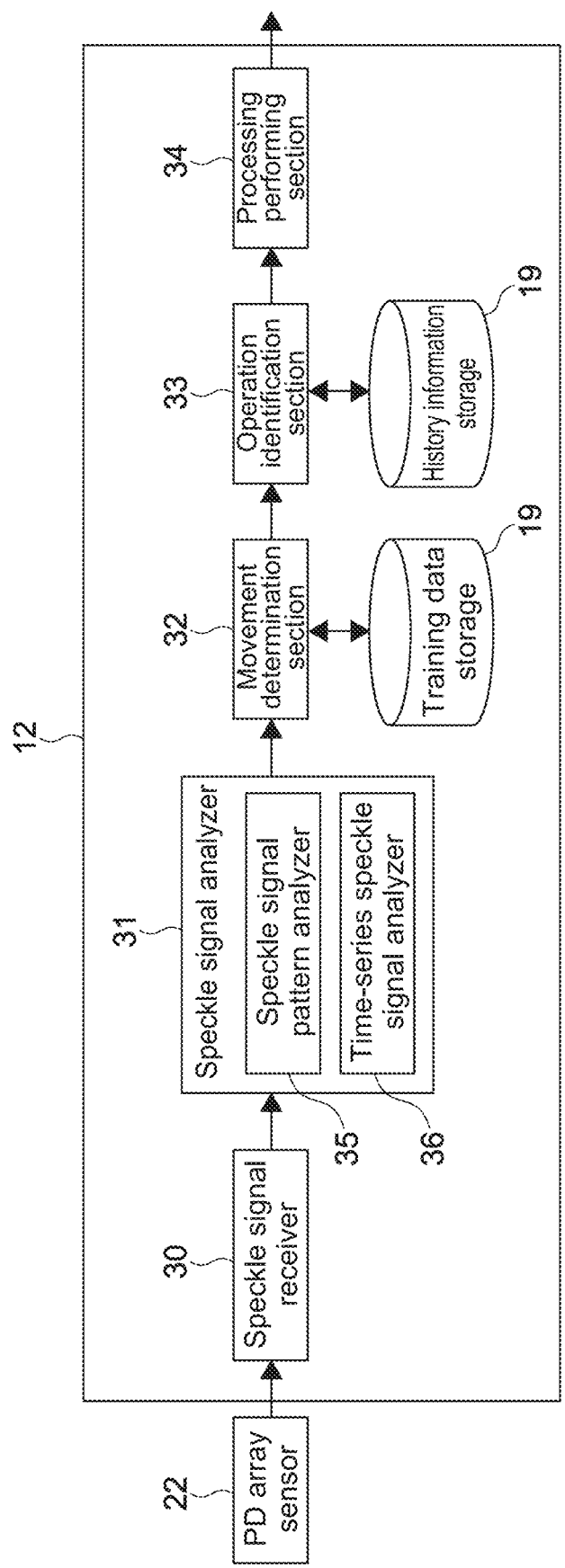
FIG. 8 is a block diagram illustrating an example of a software configuration of the wearable apparatus.
Figure 9:
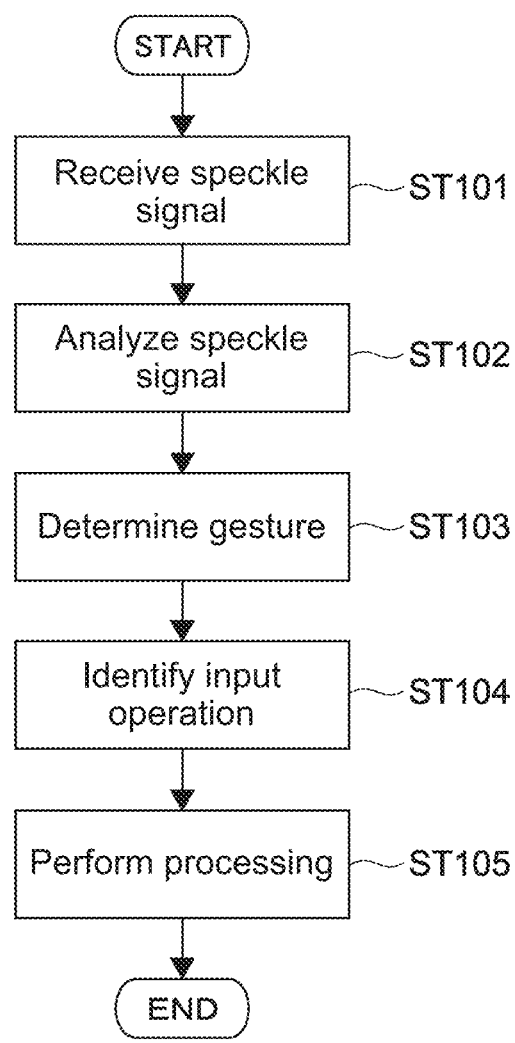
FIG. 9 is a flowchart illustrating an example of an operation of the wearable apparatus.

FIG. 8 is a block diagram illustrating an example of a software configuration of the wearable apparatus 100. FIG. 9 is a flowchart illustrating an example of an operation of the wearable apparatus 100. The detection signal output from the PD array sensor 22 may be hereinafter referred to as a speckle signal.

In the present embodiment, a speckle signal receiver 30, a speckle signal analyzer 31, a movement determination section 32, an operation identification section 33, and a processing performing section 34 are implemented by the CPU of the controller 12 executing a program according to the present technology. An information processing method according to the present technology is performed by these blocks. In order to implement each block, dedicated hardware may be used as appropriate.

Further, in FIG. 8, the storage 19 is schematically illustrated in the controller 12 in order to easily understand the fact that training data and history information are read from the storage 19.

A plurality of detection signals (speckle signals) output from the PD array sensor 22 is received by the speckle signal receiver 30 (Step 101). In the present embodiment, the speckle signal receiver 30 serves as a receiver.

The speckle signal is analyzed by the speckle signal analyzer 31 (Step 102). In the present embodiment, a speckle pattern is analyzed by the speckle signal pattern analyzer 35. Further, a time-series change in a speckle pattern at a plurality of times is analyzed by the time-series speckle signal analyzer 36. As described above, results of the analyses are included in the information regarding a speckle.

A movement of a hand of a user is determined by the movement determination section 32 on the basis of the result of the analysis performed by the speckle signal analyzer 31. In other words, a gesture made by the user is determined (Step 103). In the present embodiment, the movement determination section 32 corresponds to a determination section that determines a movement of a user on the basis of the information regarding a speckle that is included in the plurality of detection signals.

In the present embodiment, a movement of a user (a gesture of a user) is determined according to a specified machine learning algorithm. For example, a machine learning algorithm using a neural network such as a recurrent neural network (RNN), a convolutional neural network (CNN), or multilayer perceptron (MLP) is used. Moreover, any machine learning algorithm that performs, for example, supervised learning, unsupervised learning, semi-supervised learning, or reinforcement learning may be used.

In the present embodiment, the storage 19 stores therein training data that includes a right answer label (a gesture of a user) and a result of analyzing a speckle signal that corresponds to the right answer label. The movement determination section 32 performs learning according to a specified machine learning algorithm using the stored training data. This makes it possible to improve the accuracy in determining a gesture of a user.

Figure 10:
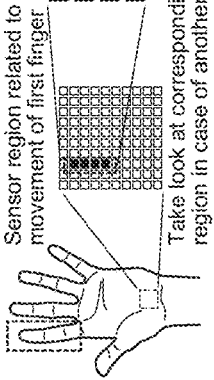
FIG. 10 is a table of examples of determinable gesture patterns.
Figure 11:
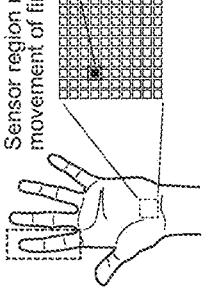
FIG. 11 is a table of examples of determinable gesture patterns.

FIGS. 10 and 11 are tables of examples of determinable gesture patterns. As illustrated in FIG. 10, it is possible to determine a gesture of shaking a finger in the air as an independent movement of a finger. It is possible to determine both a movement of shaking a single finger and a movement of shaking a plurality of fingers.

For example, it is also possible to determine a sensor region corresponding to a movement of each finger with respect to spatial direction information, that is, a two-dimensional speckle pattern. In other words, an analysis-target PD 26 and a detection signal thereof may be selected from a plurality of PDs 26 as appropriate. For example, it is possible to set the sensor region corresponding to a movement of each finger in advance on the basis of the movement of the finger and a change in a speckle pattern. Of course, the sensor region corresponding to a movement of each finger may be set using machine learning.

An intensity change for a period corresponding to the shaking movement occurs with respect to temporal direction information, that is, a time-series change in a detection signal output by each PD 26. In the example illustrated in FIG. 10, a temporal change in a detection signal of the PD 26 in a sensor region corresponding to a movement of a first finger is analyzed. Then, the shaking movement is determined according to the periodicity of the temporal change.

Features of the spatial direction information and the temporal direction information with respect to the shaking movement illustrated in FIG. 10 are examples found by the inventors, and the determination of the shaking movement is not limited to the case in which such features are exhibited. For example, it is also possible to determine the shaking movement on the basis of other features when the other features are exhibited. Of course, the shaking movement may be determined by inputting signal intensity and a time-series change in the intensity without any change using machine learning.

Further, on the basis of a change in a distribution of the intensity of a detection signal, a sensor region in which there is a greatest change is calculated. A moved finger is determined on the basis of the calculated sensor region, and a movement of the finger is determined on the basis of a detection signal of the PD 26 included in the sensor region. Such a determination method is also possible.

Further, it is possible to determine a gesture of flexing a finger as an independent movement of a finger. It is possible to determine both a movement of flexing a single finger and a movement of flexing a plurality of fingers. In the example illustrated in FIG. 10, a temporal change in a detection signal of the PD 26 in a sensor region corresponding to a movement of a first finger is analyzed. A variation in the intensity of a detection signal (a variation in the intensity of scattered light) is increased since an amount of deformation of the surface 4a of the skin 4 is increased due to flexing of a finger. It is possible to determine the flexing movement on the basis of such a feature. Of course, the determination of the flexing movement is not limited to the case in which such a feature is exhibited.

As illustrated in FIG. 10, it is possible to determine a gesture of rubbing fingers and a gesture of tapping a finger against a finger as movements performed with fingers. In the example illustrated in FIG. 10, a sensor region related to rubbing of a first finger and a thumb, and a sensor region related to tapping a first finger against a thumb are set to be analysis targets. For example, it is possible to set the sensor region related to each movement in advance on the basis of each movement and a change in a speckle pattern. Of course, the sensor region related to each movement may be set using machine learning.

The PD 26 that is included in a sensor region related to each movement and related to a first finger, and the PD 26 that is included in the sensor region related to the movement and related to a thumb exhibit a similar phenomenon. In the present embodiment, the gestures are determined on the basis of the fact that a peak frequency due to rubbing of fingers and a peak frequency due to tapping of a finger against a finger respectively exhibit unique values. In other words, the gesture of rubbing fingers and the gesture of tapping a finger against a finger are determined on the basis of a peak frequency for a time-series change in a detection signal of each PD 26. Of course, the determination of the gestures is not limited to the case in which such features are exhibited.

In the example illustrated in FIG. 10, a movement average of the intensity of a detection signal of the PD 26 (an average for each specified interval) is acquired as the "temporal direction information" for the "independent movement of a finger". The calculation of the average for each specified interval makes it possible to perform smoothing on a small temporal variation to macroscopically observe a trend of a signal. On the other hand, a change in the intensity of a detection signal of the PD 26 is acquired as the "temporal direction information" for the "movement performed with fingers" without any change. As described above, various methods may be adopted as a method for acquiring the "temporal direction information" from a detection signal.

As illustrated in FIG. 11, it is possible to determine a gesture of rubbing a finger against an object as a movement performed with a finger with respect to an object. It is possible to determine both rubbing with a single finger and rubbing with a plurality of fingers. It is also possible to respectively determine rubbing movements in different rubbing directions.

In the example illustrated in FIG. 11, one of the PDs 26 in a sensor region corresponding to a movement of a first finger is selected to be an analysis target. The gesture of rubbing a finger against an object is determined on the basis of a peak frequency for a time-series change in a detection signal of the selected PD 26. Of course, the determination of the gesture is not limited to the case in which such a feature is exhibited.

Further, as illustrated in FIG. 11, it is possible to determine a gesture of tapping an object with a finger as the movement performed with a finger with respect to an object. It is possible to determine both tapping with a single finger and tapping with a plurality of fingers.

In the example illustrated in FIG. 11, one of the PDs 26 in a sensor region corresponding to a movement of a first finger is selected to be an analysis target. The gesture of tapping an object with a finger is determined on the basis of a peak frequency for a time-series change in a detection signal of the selected PD 26. Of course, the determination of the gesture is not limited to the case in which such a feature is exhibited.

Note that, as illustrated in FIG. 11, the frequency and the peak frequency for a time-series change in a detection signal vary depending on how a finger is flexed (an amount of flexing of a finger, a speed of flexing of the finger, and the like) when an object is tapped with the finger. Therefore, the analysis of a time-series change in a detection signal makes it possible to determine how a finger is flexed (an amount of flexing of a finger, a speed of flexing of the finger, and the like) when an object is tapped with the finger.

Referring back to FIGS. 6A, 6B, and 6C, an operation input by the user is identified by the operation identification section 33 on the basis of the determined gesture (Step 104). In other words, the content of the input operation using the gesture is identified.

For example, on the basis of information such as a currently selected operation mode and an application that is being executed, it is determined what input operation the gesture of the user corresponds to.

The processing performing section 34 performs a process corresponding to the gesture determined by the movement determination section 32. Specifically, the processing performing section 34 performs a process corresponding to the operation input by the user and identified by the operation identification section 33 (Step 105). In the present embodiment, an execution section is implemented by the operation identification section 33 and the processing performing section.

Specific examples of identification of a gesture operation and an execution of a process corresponding to the gesture operation are described below.

Figure 12A:
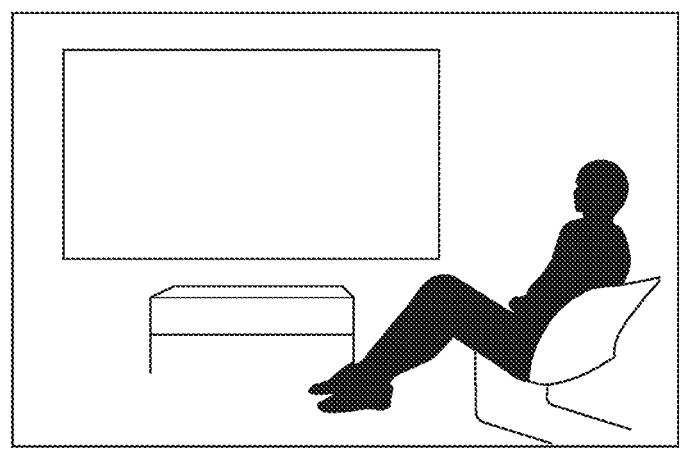
FIGS. 12A, 12B, 12C, and 12D are schematic diagrams describing an example of a virtual remote controller using the present technology.

FIGS. 12A, 12B, 12C, and 12D are schematic diagrams describing an example of a virtual remote controller using the present technology. It is assumed that a user is seated in a room, and the wearable apparatus 100 according to the present technology is worn on the left hand of the user, for example, as illustrated in FIG. 12A.

For example, an operation of the remote controller is assigned to a gesture using a finger of the left hand. This makes it possible to control a TV, a speaker, lighting, air conditioning, and the like in the room by use of the gestures using the finger of the left hand.

For example, a gesture is associated with a device operation as indicated below.

Figure 12B:
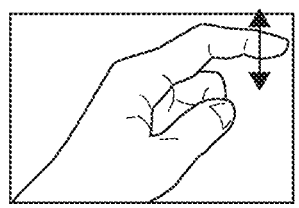
Figure 12C:
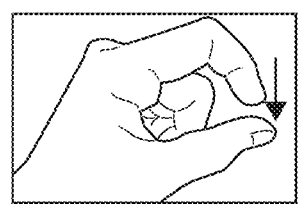
Figure 12D:
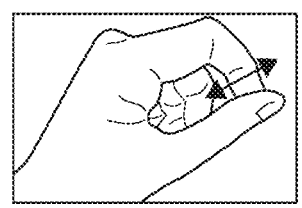

Gesture of shaking a single finger up and down as illustrated in FIG. 12B for selection of a control-target device Tap of a finger against a finger illustrated in FIG. 12C for selection of an operation item Gesture of rubbing fingers illustrated in FIG. 12D for control on an operation item A gesture of shaking a single finger up and down is determined by the movement determination section 32. The operation identification section 33 identifies an input of an operation of selecting a control-target device, the input being performed using the gesture. Here, it is assumed that a TV is selected as the control-target device.

A tap of a finger against a finger is determined by the movement determination section 32. The operation identification section 33 identifies an input of an operation of selecting an operation item, the input being performed using the gesture. Here, it is assumed that a volume adjustment is selected.

A gesture of rubbing fingers is determined by the movement determination section 32. The operation identification section 33 identifies an input of controlling an operation item, the input being performed using the gesture. It is assumed that, for example, rubbing quickly is assigned to turning the volume up, and rubbing slowly is assigned to turning the volume down. The operation identification section 33 identifies whether the input operation indicates turning the volume up or turning the volume down.

The processing performing section 34 performs a process corresponding to the identified input operation. In other words, when the input operation indicates turning the volume up, the processing performing section 34 transmits, to the TV, a control signal for turning the volume up. When the input operation indicates turning the volume down, the processing performing section 34 transmits, to the TV, a control signal for turning the volume down.

The use of the present technology as described above makes it possible to provide a virtual remote controller, and to achieve a high degree of usability. The assignment of a remote control operation to a gesture, the control-target device, the control method, and the like can be set discretionarily.

Figure 13A:
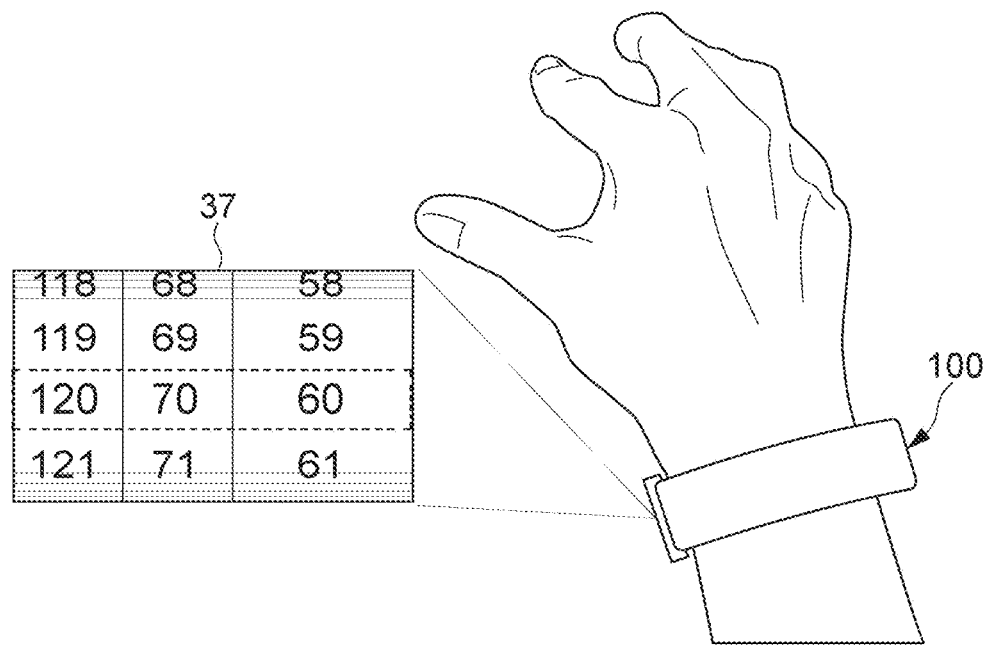
FIGS. 13A and 13B are diagrams describing an example of a virtual dialog box using the present technology.
Figure 13B:
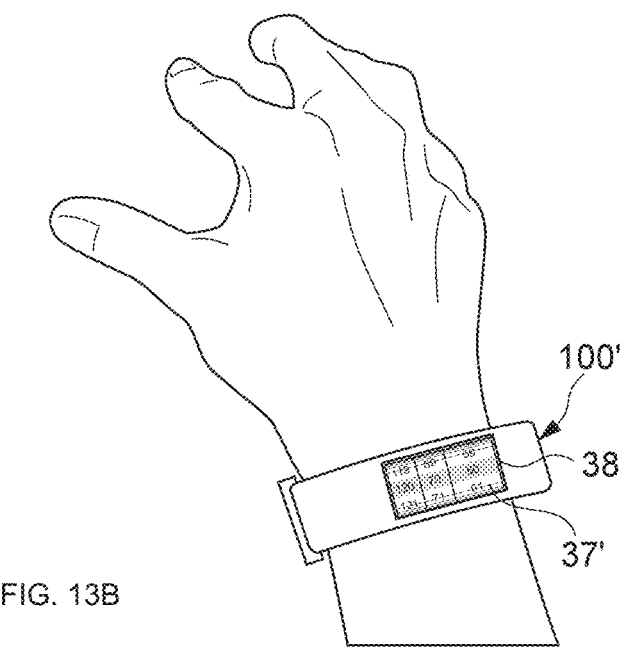

FIGS. 13A and 13B are diagrams describing an example of a virtual dialog box using the present technology. Note that, in the example illustrated in FIGS. 13A and 13B, the wearable apparatus 100 according to the present technology is worn on the right hand.

As illustrated in FIG. 13A, the projector 14 of the wearable apparatus 100 displays a spinning wheel UI 37 as a dialog box on the surface of a desk, a wall, or the like. For example, a gesture using a finger of the right hand makes it possible to operate the displayed spinning wheel UI 37.

For example, a wheel that is to be rotated is selected depending on which finger is used, and the selected wheel is rotated using the gesture of rubbing a finger. As a specific example, when the gesture of rubbing a thumb against the surface is determined, the operation of rotating a leftmost wheel is recognized, and the leftmost wheel is rotated. When the gesture of rubbing a first finger against the surface is determined, the operation of rotating a center wheel is recognized, and the center wheel is rotated. When the gesture of rubbing a second finger against the surface is determined, the operation of rotating a rightmost wheel is recognized, and the rightmost wheel is rotated.

When the operation of tapping one of the fingers against the surface is determined, an operation of inputting a value selected by rotating a wheel is identified, and the selected value is input. For example, such processing is performed.

In a wearable apparatus 100' illustrated in FIG. 13B, a display 38 that serves as a display section is provided to an outside of the wrist (a back of the hand). For example, a gesture using a finger of the right hand makes it possible to operate a spinning wheel UI 37' displayed on the display 38.

As described above, it is possible to input an operation with respect to a GUI displayed on the projector 14 or the display 38 using a gesture. For example, it is possible to achieve a high degree of usability by applying the present technology to a wearable apparatus having no display section, a wearable apparatus having a small display section, or a wearable apparatus having no input section.

Figures 14A, 14B, 15:
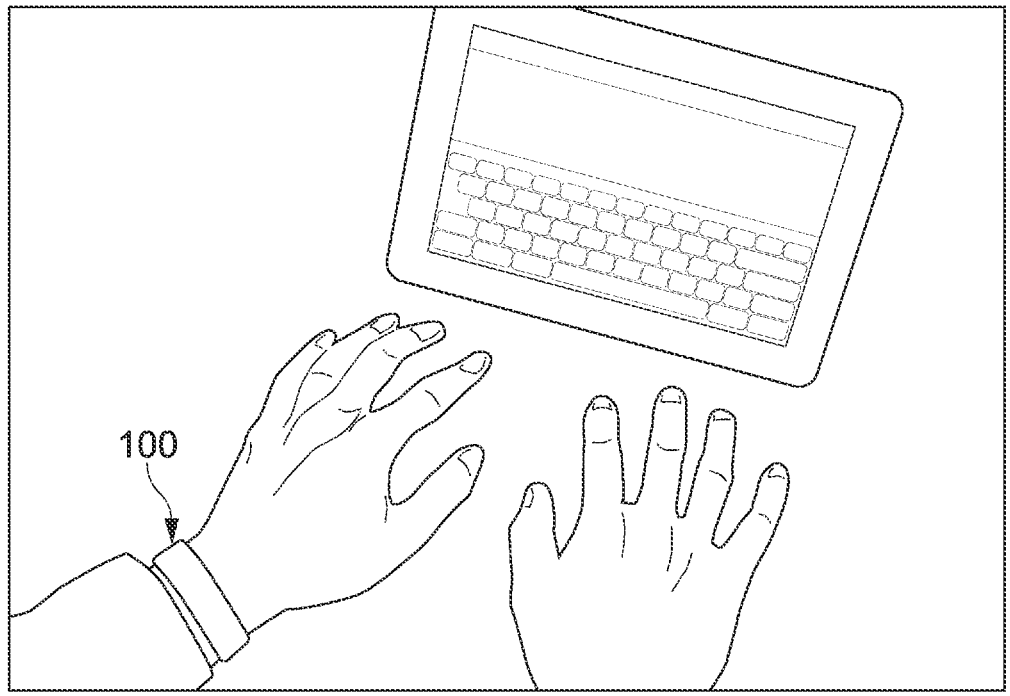
FIGS. 14A and 14B schematically illustrate an example of an input UI.
FIG. 15 is a diagram describing an example of a virtual keyboard using the present technology.

The present technology is applicable not only to the spinning wheel UI 37 but also to various UIs for input as illustrated in FIGS. 14A and 14B. For example, a column is selected depending on which finger is used and a row is selected depending on how the finger is moved to determine an input-target character or value. Other gestures may be used as appropriate. Moreover, the present technology is applicable to any GUI used as a UI for input, such as a UI for selecting a desired selection tab from a plurality of selection tabs, or a UI for displaying a menu including a plurality of options when a pull-down button is selected.

FIG. 15 is a diagram describing an example of a virtual keyboard using the present technology. In the example illustrated in FIG. 15, the wearable apparatus 100 is worn on the left hand of a user.

Using ten fingers, a desk or the like is tapped as if it is an operation performed on an actual keyboard. This makes it possible to perform keyboard input. For example, a tap with a specified finger is determined, and on which key the operation input is performed is recognized on the basis of which finger the finger is, how fingers are spread, how the finger is flexed, and the like. Then, input is performed on a corresponding key.

For example, the attachment of the wearable apparatus 100 according to the present technology to each of the wrists of both hands makes it possible to determine a gesture using ten fingers, and thus to provide a virtual keyboard. This results in being able to achieve a high degree of usability.

Figure 16:
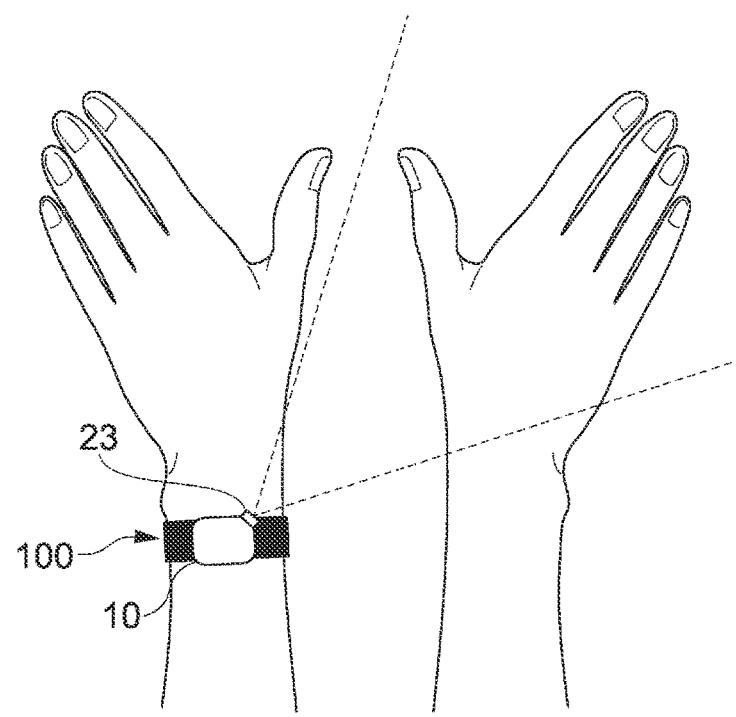
FIG. 16 is a schematic diagram illustrating an example of a method for providing a virtual keyboard.

Alternatively, as illustrated in FIG. 16, an image of a hand on which the wearable apparatus 100 is not worn is captured by the camera 23 included in the wearable apparatus 100. It is also possible to determine s movement of the hand on the basis of the captured image, and to identify the key input. Such a method may be used to provide a virtual keyboard.

In the example illustrated in FIG. 16, the wearable apparatus 100 is attached such that the main body 10 is situated on an outside of the wrist (on the side of a back of the hand). As will be described later, the position at which the body 10 is fixed is not limited, and may be set discretionarily as long as it is arranged to face the skin.

Figure 17:
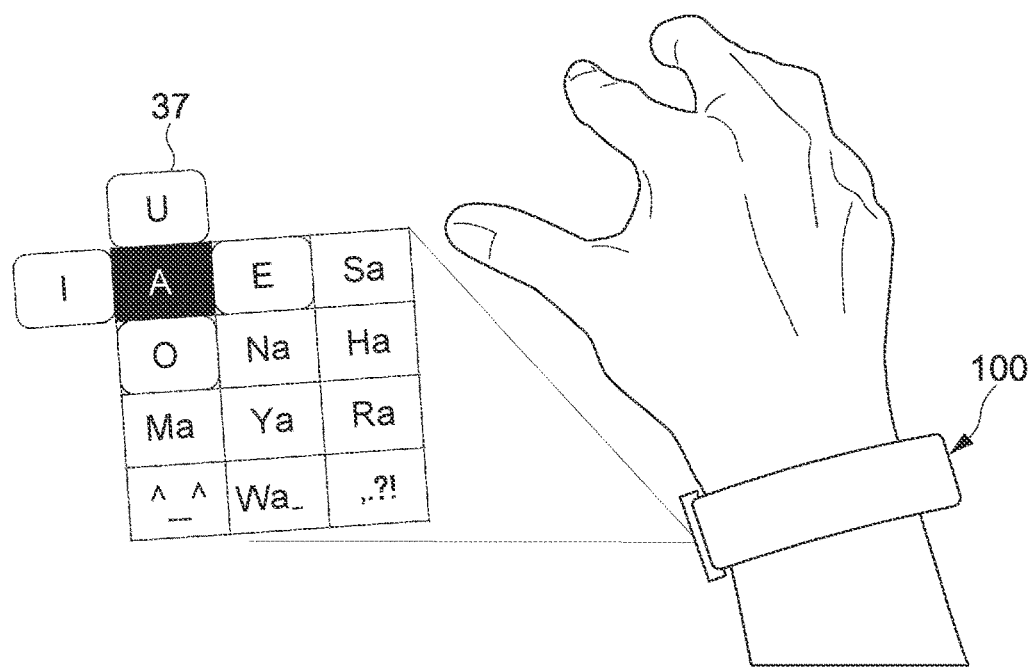
FIG. 17 is a diagram describing an example of a virtual flick input performed using the present technology.

FIG. 17 is a diagram describing an example of a virtual flick input performed using the present technology. It is possible to perform a flick input by use of a gesture using a finger. For example, when it is determined that a portion is touched with a finger for a specified period of time or longer, a process of displaying a UI 39 for flick input around the portion is performed. After that, when the gesture of rubbing a finger and the gesture of lifting the finger off are determined, a selected character is identified on the basis of how to rub with the finger (the rubbing direction), and the selected character is input.

It is assumed that a user selects a character by tapping the UI for flick input. In this case, it is also possible to identify which character has been selected by detecting vibration or the like depending on the tap. This makes it possible to achieve a high degree of usability.

As illustrated in FIG. 8, identification processing performed by the operation identification section 33 may be performed using history information stored in the storage 19. The history information is information regarding an operation input by a user in the past. The history information is not limited to information regarding an operation input using a gesture, and may include information regarding an operation input by another method. In the present embodiment, the storage 19 storing therein history information corresponds to a history information storage.

For example, when key input using the virtual keyboard illustrated in FIG. 15 is performed, an input data history input in the past is referred to as history information. For example, input data is accumulated, and a next input is predicted from a pattern of the input data. When identification based on a gesture and a result of the prediction are combined to comprehensively identify an input operation, this results in being able to improve the identification accuracy.

Examples of the prediction from a pattern of input data include a method using n-gram. In n-gram, appearance frequencies of N consecutive input data strings are stored, probabilities of an input that follows the N−1 input strings are obtained using a distribution of the appearance frequencies, and a highest one is determined to be an estimation result. For example, it is assumed that "son" is input. Here, it is assumed that a distribution of appearance frequencies of a following input is the following: 7 for sony, 10 for song, 2 for sona, and 1 for sone. Therefore, "g" is determined to be the estimation result (the probability is ½).

When a gesture determination, an estimation result obtained using N-gram or a distribution of appearance frequencies of a following input, and the like are comprehensively determined, this results in being able to identify a next input character with a high degree of accuracy. Note that the reliability of a gesture determination, the reliability of an operation identified on the basis of the gesture determination, and the like may be calculated, and the parameters may be used when a comprehensive determination is performed.

It is also possible to identify an operation using history information when, for example, an application other than a virtual keyboard is executed. A specific type of historical information is not limited, and any information may be used as the historical information. Further, the method is not limited to a method using N-gram, and any method may be used.

Figure 18:
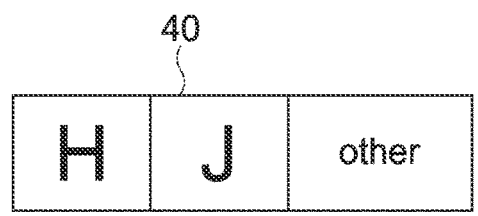
FIG. 18 schematically illustrates an example of a selection image.

FIG. 18 schematically illustrates an example of a selection image. The selection image is an image that includes a plurality of selection candidates that can be selected by a user, and corresponds to a GUI for selecting a candidate.

On the basis of a gesture determination, a plurality of operations may be identified by the operation identification section 33 as a plurality of candidates. For example, it is assumed that, when a key input using a virtual keyboard is performed, two operations that are an operation of inputting "H" and an operation of inputting "J" are identified as candidates on the basis of gesture determination. In such a case, a selection image 40 having "H" and "J" as selection candidates is displayed, as illustrated in FIG. 18. It can also be said that the selection image 40 is an image used to inform a user that "H" and "J" have been identified as candidate operations.

Note that the selection image 40 also includes "other" with which an input indicating that it is not a selection candidate can be performed. The user selects one of "H", "J", and "other" by operating the selection image 40. Of course, it is also possible to input the operation using a gesture. The display of the selection image 40 also makes it possible to easily input an operation when there exists a plurality of candidates. Also, even if the operation is incorrectly identified, it is sufficient if a user only takes a single step of selecting "other" without taking two steps of "deletion" and "reselection". This makes it possible to achieve a high degree of usability.

Note that it is also possible to assign, as a special operation, an input indicating that it is not a selection candidate, instead of selecting "other". For example, when two taps are input at the same time, an input is performed that indicates that the taps are not selection candidates in the selection image 40.

It is also possible to display the selection image 40 when, for example, an application other than a virtual keyboard is being executed. A selection image including a plurality of selection candidates for each application may be displayed as appropriate.

Note that, when the reliability of a gesture determination, the reliability of an operation identified on the basis of the gesture determination, or the like is calculated, the selection image is displayed when the reliability is not greater than a specified threshold. Such processing is also possible.

Figure 19:
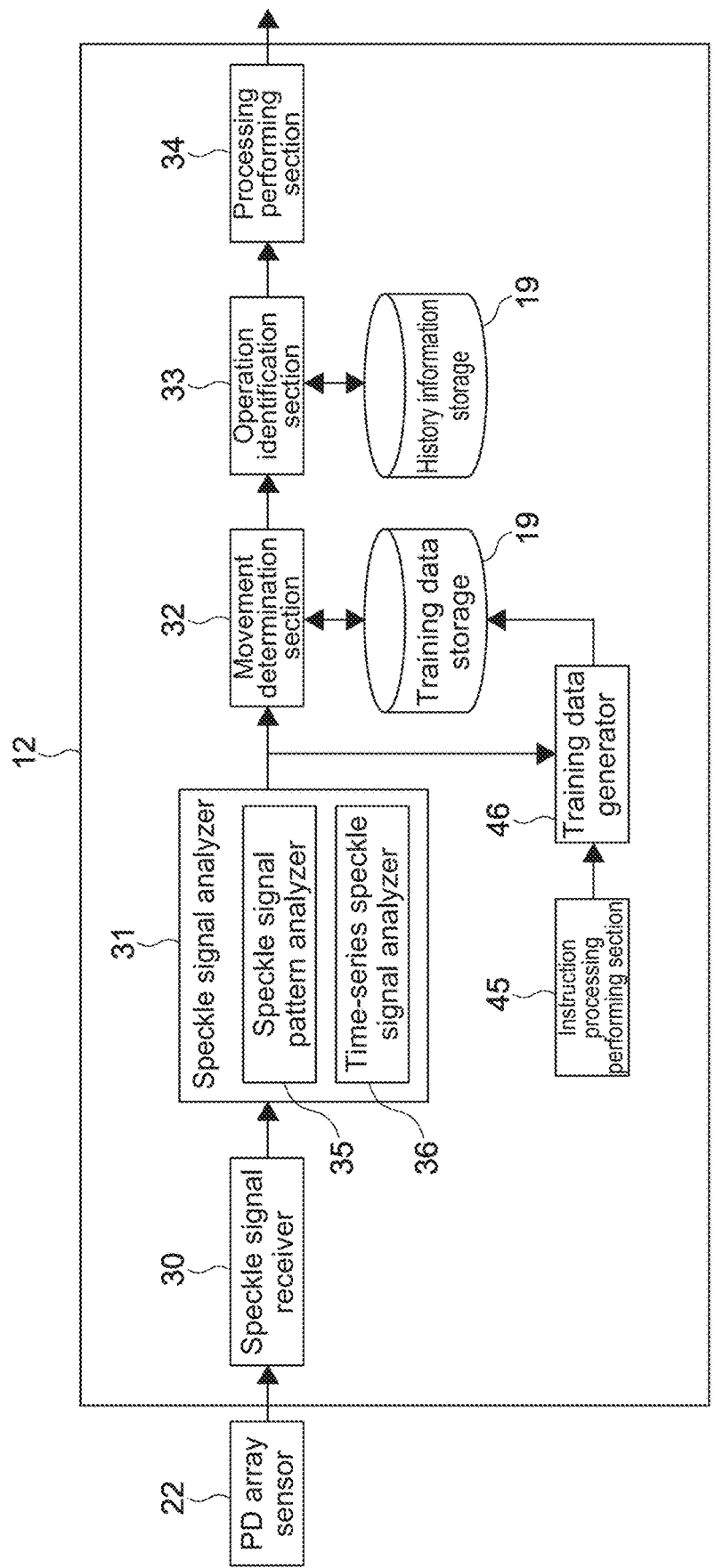
FIG. 19 schematically illustrates an example of a configuration related to generation of training data.

An example of generating training data is described with reference to FIGS. 19 and 20. As illustrated in FIG. 19, an instruction processing performing section 45 and a training data generator 46 are included in the controller 12. The instruction processing performing section 45 instructs a user to perform a specified movement (make a specified gesture).

The training data generator 46 generates training data that includes a result of analyzing a speckle signal output from the PD array sensor 22 (information regarding a speckle) when the user makes the specified gesture that the user has been instructed to make. In other words, the gesture that the user has been instructed to make is set to be a right answer label, the right answer label is associated with a result of analysis performed when the user makes the gesture, and the associated right answer label and analysis result are generated as the training data. In the present embodiment, the training data corresponds to determination information, and the storage 19 storing therein the training data corresponds to a determination information storage.

For example, the projector 14 of the wearable apparatus 100 displays the UI for input illustrated in FIG. 14B on a display surface of a desk or the like. Then, for example, instructions indicated below are given by displaying a text image or by outputting sound from the speaker 13.

(1) Tap a first finger against a display surface as if tapping "4".
(2) Move the first finger upward and perform tapping as if tapping "7" situated at a next higher position.
(3) Move the first finger downward and perform tapping as if tapping "1" situated at a next lower position.
(4) Move the first finger further downward and perform tapping as if tapping "0" situated at a further next lower position.

The instruction processing performing section 45 outputs, to the training data generator 46, information regarding a gesture corresponding to each of the instructions (1) to (4), that is, information regarding a right answer label. The training data generator 46 generates training data by associating the received right answer label with a result of analysis performed when the gesture is made. In this example, an instruction section is implemented by the projector 14, the speaker 13, and the instruction processing performing section 45.

Note that there is no limitation on what gesture is to be made by a user, and it may be set discretionarily. There is also no limitation on how to make the gesture, and any method may be adopted.

For example, when the wearable apparatus 100 starts to be used or when a specified UI starts to be used, an instruction to perform an operation (make a gesture) with respect to the UI is given as an initial calibration. Then, training data is generated, and the movement determination section 32 is caused to perform learning. This makes it possible to suppress the influence of an individual difference such as the size of a hand and the length of a finger, and thus to perform a gesture determination and an operation identification that are suitable for each person.

Figure 20:
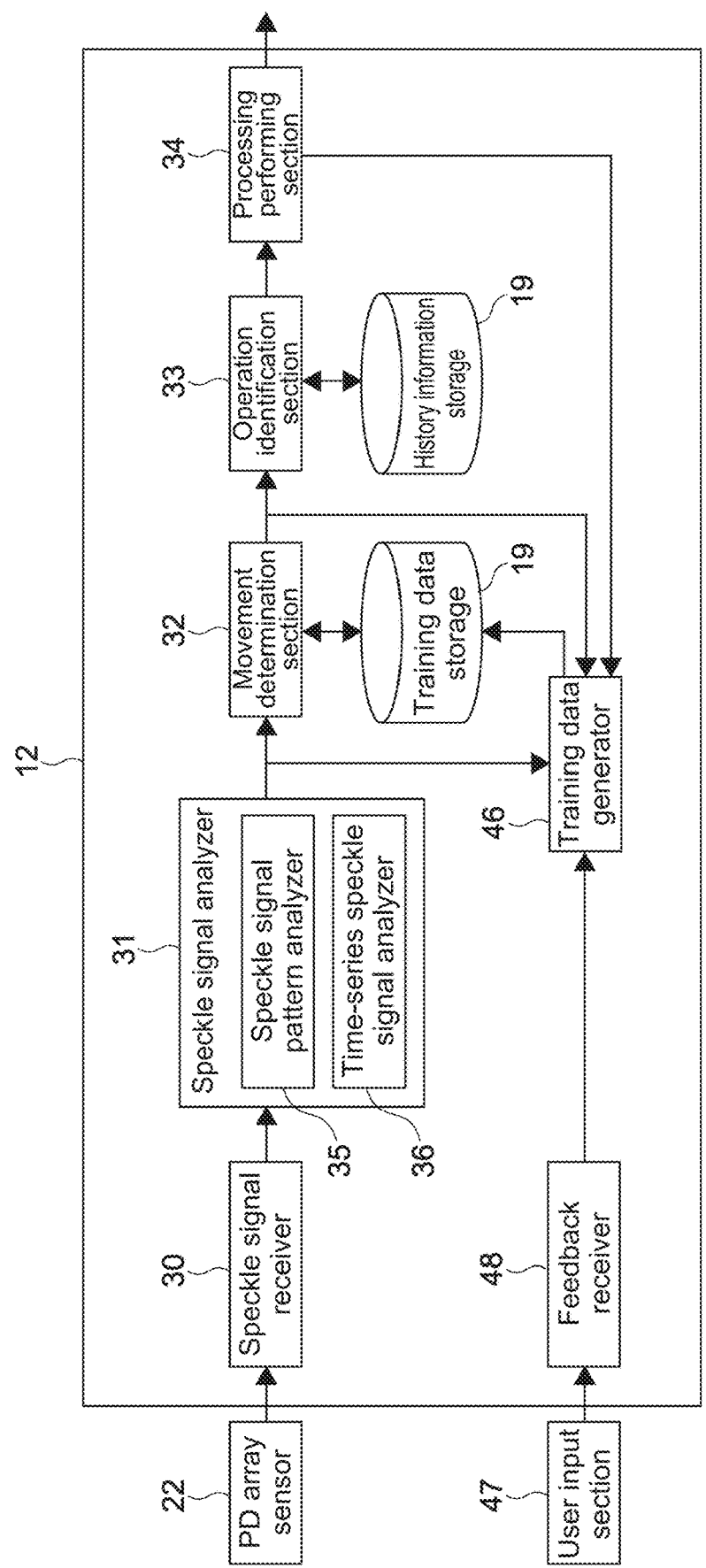
FIG. 20 schematically illustrates an example of a configuration related to generation of training data.

In the example illustrated in FIG. 20, right-or-wrong information regarding whether a determination result obtained by performing a gesture determination is right is input through a user input section 47. Any configuration that makes it possible to input right-or-wrong information may be adopted in order to implement the user input section 47.

For example, it may be possible to input the right-or-wrong information by performing an operation on a UI displayed by the projector 14 illustrated in FIG. 3, by performing an operation on the touch panel 15 illustrated in FIG. 3, or by performing an operation on the operation button 16 illustrated in FIG. 3. For example, selection of a delete key "Del" displayed by the projector 14 or the touch panel 15, selection of a specified delete button included in the operation button 16, or the like may be performed. Further, a microphone or the like may be included, and it may be possible to input the right-or-wrong information by a voice input being performed by a user. Alternatively, it may be possible to input the right-or-wrong information by performing a special gesture operation.

The right-or-wrong information regarding whether a determination result obtained by performing a gesture determination is right is typically information indicating whether processing performed by the processing performing section is right. When a process is performed that is unintended by a user who has performed a gesture operation, information indicating this matter is input as right-or-wrong information. For example, when "H" has been input to a virtual keyboard but "J" has actually been input, right-or-wrong information is input that indicates that a determination result obtained by performing a gesture determination is wrong. Other information may be used as the right-or-wrong information.

Of course, input of information indicating that a determination result is a wrong answer is not limitative, and information indicating that a determination result is a right answer may be input. For example, processing is performed again after right-or-wrong information of a wrong answer is input, and right-or-wrong information of a right answer is input in order to perform an input indicating that the processing is right. Of course, such a case is not limitative.

The right-or-wrong information input by the user is received by a feedback receiver 48 included in the controller 12. The feedback receiver 48 outputs right-or-wrong information to the training data generator 46. In the present embodiment, the feedback receiver 46 serves as a reception section.

For example, the training data generator 46 generates training data on the basis of a result of determination performed by the movement determination section 32 and an analysis result output from the speckle signal analyzer 31, and stores the training data in the storage 19. Here, the right-or-wrong information output from the feedback receiver 48 is referred to. For example, when right-or-wrong information indicating a wrong answer is received, the training data generated when processing of receiving feedback of a wrong answer is performed, is updated.

Specifically, after that, processing is performed again, and feedback of a right answer is received. In this case, it is possible to update training data by updating a right answer label to a gesture related to the processing performed again. If it is not possible to update training data, the training data may be discarded.

Such reception of right-or-wrong information from a user makes it possible to update training data, and to cause the movement determination section 32 to perform learning accurately. Further, it is possible to suppress the influence of an individual difference among users, and to perform a gesture determination and an operation identification that are suitable for each person.

As described above, in the wearable 100 according to the present embodiment, light is irradiated onto a body site of a user, and a plurality of detection signals is output on the basis of its reflected light. Then, a gesture of the user is determined on the basis of information regarding a speckle that is included in the plurality of detection signals, that is, on the basis of a result of analyzing a speckle signal. This results in being able to provide various applications described as examples above, and to achieve a high degree of usability.

For example, there is a method including scanning a laser beam from a watch-type wearable apparatus and detecting a movement of a fingertip entering an irradiation area on the basis of, for example, a change in reflected light. However, it is very difficult to detect, by this method, a movement of a hand on which the wearable apparatus is worn. Therefore, there is a need to perform a gesture operation using the other hand, and this is less convenient for a user.

Further, in the case of a method for determining a gesture using, for example, an acceleration sensor, it is difficult to perform a right determination unless an arm is moved largely, and this results in imposing a heavy burden on a user. Further, it is not possible to determine a fine gesture made using a finger.

Further, there is a method for determining a gesture by attaching a cap-side sensor to a finger. However, the cap-side sensor is not comfortable to attach, and this results in imposing a burden on a user. Furthermore, there is a need to attach a finger cap depending on the number of fingers desired to be sensed, and this results in an increase in costs for introducing a device.

Moreover, there is a method for detecting a sound of rubbing fingers using, for example, a microphone. However, there is a need for a sensor such as a microphone in this method, and this results in an increase in costs for introducing a device.

The wearable apparatus 100 according to the present embodiment makes it possible to determine a gesture with a high degree of accuracy on the basis of information regarding a speckle generated by irradiating light onto a body site, that is, a speckle pattern; a time-series change in the speckle pattern; a peak frequency of the speckle pattern; and the like, and makes it possible to identify an input operation with a high degree of accuracy.

Therefore, it is possible to input a gesture operation only using a hand on which the wearable apparatus 100 is worn, and to catch, for example, a fine movement of a finger. This results in providing a very high degree of usability. Further, it is possible to determine a gesture of tapping of a hand and a gesture of rubbing of a hand without using a device such as a microphone or a cap-type sensor, and this results in being able to reduce costs for introducing a device.

Further, in the present embodiment, the PD array sensor 22 is used as the detector. Therefore, it is possible to detect a change in an amount of light for a small period of time, compared to using an image sensor such as a charge coupled device (CCD) sensor or a complementary metal-oxide semiconductor (CMOS) sensor. Consequently, it is possible to determine a gesture of a user with a high degree of accuracy.

Further, it is possible to operate the PD array sensor 22 with a lower power consumption and thus to drive the PD array sensor 22 for a longer time, compared to using an image sensor. Further, since the PD array sensor 22 is sensitive, it is possible to reduce power of laser light emitted to a body site, and this provides an advantage in reducing power consumption. It is also possible to reduce the size of a condenser or the like, and thus to reduce costs.

Further, it is possible to sufficiently suppress the influence of a brightness of the environment in which the wearable apparatus 100 is used. For example, in the case in which image-capturing is performed on a movement of a hand using an image sensor, there is a decrease in the identification accuracy if it is dark in the surroundings. In the present embodiment, the light source section 21 and the PD array sensor 22 are arranged very close to a body site, and the intensity of reflected light is detected. Therefore, it is possible to analyze a speckle pattern and the like with a high degree of accuracy without being affected by brightness in the surroundings.

It is also possible to provide the present technology using an image sensor. In other words, it is also possible to determine a gesture of a user on the basis of a speckle pattern of which an image is captured by the image sensor and to identify an input operation. In this case, the image sensor serves as the detector, and a plurality of pixels of the image sensor serves as a plurality of light detector. Further, a plurality of pixel signals output from the plurality of pixels corresponds to a plurality of detection signals. The use of an image sensor makes it possible to improve the spatial resolution.

Other Embodiments

The present technology is not limited to the embodiments described above, and can achieve various other embodiments.

In the example of a configuration illustrated in FIG. 8, the determination information storage and the history information storage are implemented by the storage 19, and movement determination processing using training data and operation identification processing using history information are performed. The configuration is not limited to this, and a configuration that only includes one of the determination information storage and the history information storage and a configuration that does not include the determination information storage or the history information storage are also included in embodiments of the information processing apparatus according to the present technology. In other words, the movement determination processing may be performed without using determination information such as training data, or the operation identification processing may be performed without using history information. Likewise, with respect to the examples of a configuration in FIGS. 19 and 20, the configuration without the history information storage may be adopted as an embodiment of the information processing apparatus according to the present technology.

In the description above, the determination information storage and the history information storage are implemented by the storage 19, but the determination information storage and the history information storage may be separately implemented by different storages or the like.

In the description above, a movement of a user (a gesture of a user) is determined using machine learning, on the basis of a result of analyzing a speckle signal. Then, an operation input by the user is identified on the basis of a result of the determination. The configuration is not limited to this, and the operation input by a user may be identified using machine learning, on the basis of a result of analyzing a speckle signal. In other words, an estimation on what operation has been input may be performed without determining how a user has moved.

In this case, the movement determination section 32 and the operation identification section 33 illustrated in, for example, FIG. 8 are integrated to form an input estimator. An input operation may be identified by the input estimator using machine learning, on the basis of a result of analyzing a speckle signal. Such a configuration also corresponds to an embodiment of the recognition apparatus and the information processing apparatus according to the present technology. Such a configuration also makes it possible to similarly perform processing using history information and training data.

In the description above, a gesture determination and an operation identification are performed on the basis of a result of analyzing a speckle signal. Alternatively, a gesture determination and an operation identification may be performed using, for example, machine learning, according to a detection signal output from the PD array sensor. In other words, the analysis step may be omitted.

It is also possible to perform a gesture determination and an operation identification without using machine learning. In other words, a rule-based gesture determination and a rule-based operation identification may be performed on a rule basis using, for example, table information. It is also possible to use, as appropriate and as determination information, data corresponding to the training data illustrated in, for example, FIG. 8 when machine learning is not used. Of course, it is also possible to adopt any learning algorithm other than machine learning.

The example in which a laser light source is used as the light source section has been described above. Note that the present technology is also applicable when another coherent light source that is capable of emitting coherent light is used.

In the description above, a PD array sensor that includes a plurality of two-dimensionally arranged PDs is used. The configuration is not limited to this, and a PD array sensor that includes a plurality of one-dimensionally arranged PDs may be used.

Figure 21A:
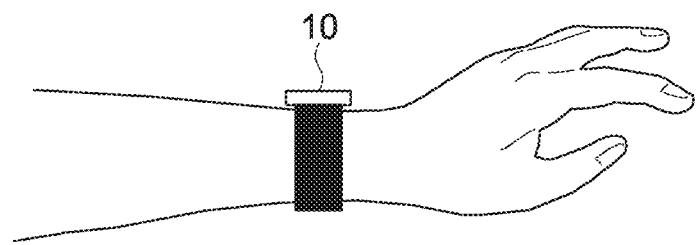
FIGS. 21A and 21B schematically illustrate other examples of positions at which a main body is fixed.
Figure 21B:
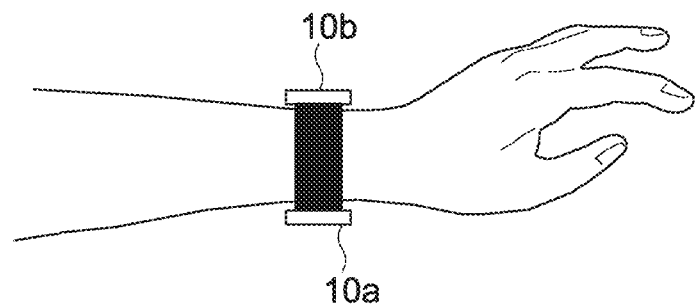

FIGS. 21A and 21B schematically illustrate other examples of positions at which the main body is fixed. As illustrated in FIG. 21A, the wearable apparatus 100 may be attached such that the main body 10 is situated on an outside of the wrist (on the side of a back of the hand). As illustrated in FIG. 21A, main bodies 10*a* and 10*b* may be respectively fixed to an inside and an outside of the wrist. In other words, analysis of a speckle pattern or the like may be performed at two positions that are an inner portion and an outer portion of the wrist. The positions at which the light source section and the detector are arranged, and the number of light source sections and the number of detectors are not limited, and may be set discretionarily.

An attachment state of the wearable apparatus may be determined on the basis of the result of analyzing a speckle signal. For example, it is also possible to perform processing including detecting a positional shift of the main body (the light source section and the detector) and urging a user to confirm the attachment state. It is also possible to perform a gesture determination and an operation identification with reference to information regarding a position of the main body (the light source portion and the detection portion).

Although the wristband wearable apparatus has been described above as an example, the application of the present technology is not limited to this. The present technology is applicable to various wearable apparatuses such as bracelet type to be worn around an upper arm, headband type to be worn on a head (head-mounted type), neckband type to be worn around a neck, body type to be worn on a chest, belt type to be worn at a waist, anklet type to be worn around an ankle, watch type, finger-ring type, necklace type, earring type, and pierced-earring type. Of course, there is also no limitation on a site irradiated with light, and the site irradiated with light may be selected discretionarily.

The movement of a user that can be determined using the present technology is not limited to a movement of the user. By appropriately setting the site to which the wearable apparatus is attached, that is, the site irradiated with light, it is possible to determine the movement of any site such as foot (thigh, knee, calf, ankle, toe), neck, waist, hip, arm, head, face, and chest.

The use of the present technology also makes it possible to perform processing indicated below.

Sign-language interpreting: capturing movements of a hand, an arm, and a finger, and verbalizing sign-language expression (for example, displaying on a smartphone).

Behavior recognition: capturing a movement of holding or grasping an object, and recognizing the behavior of a user (such as a movement of a spoon or a chopstick, a PC operation, driving a vehicle, and grasping a strap)

Recording by pen-based input: Recording a movement of a pen in an electronic medium while writing in, for example, a notebook using the pen.

The movement of a user may be determined by combining, for example, a PD array sensor and an acceleration sensor. For example, the movements respectively determined on the basis of results obtained by the respective sensors may be integrated, or the movement of a user may be determined using, for example, machine learning using, as input, the results obtained by the respective sensors.

The information processing method and the program according to the present technology can be performed not only in a computer system including a single computer, but also in a computer system in which a plurality of computers operates cooperatively. Note that, in the present disclosure, a system refers to a set of components (such as apparatuses and modules (parts)) and it does not matter whether all of the components are in a single housing. Thus, a plurality of apparatuses accommodated in separate housings and connected to one another through a network, and a single apparatus in which a plurality of modules is accommodated in a single housing are both systems.

For example, all of or some of the functions of each block included in the controller 12 may be performed by a cloud server. Further, the information processing method according to the present technology may be performed by cooperatively operating a plurality of computers capable of communicating with one another. Further, the execution of respective processes by a specified computer includes causing another computer to execute some of or all of the processes and acquiring a result of it.

The information processing method and the program according to the present technology are also applicable to a configuration of cloud computing in which a plurality of apparatuses shares tasks of a single function and works collaboratively to perform the single function through a network.

The respective configurations of the wearable apparatus, a control flow performed, and the like described with reference to the respective figures are merely embodiments, and may be modified discretionarily without departing from the spirit of the present technology. In other words, for example, any other configurations or algorithms for practicing the present technology may be adopted.

At least two of the features of the present technology described above can also be combined. In other words, various features described in the respective embodiments may be combined discretionarily regardless of the embodiments. Further, the various effects described above are not limitative but are merely illustrative, and other effects may be provided.

Note that the present technology may also take the following configurations.

(1) An information processing apparatus, including:
a light source section that irradiates light onto a body site of a user;
a detector that includes a plurality of light detectors and outputs a plurality of detection signals on the basis of reflected light that is reflected off the body site; and
a determination section that determines a movement of the user on the basis of information regarding a speckle generated due to the light being irradiated onto the body site, the information regarding a speckle being included in the plurality of detection signals.

(2) The information processing apparatus according to (1), in which
the light source section irradiates laser light onto the body site.

(3) The information processing apparatus according to (1) or (2), in which
the plurality of light detectors is a plurality of photodiodes.

(4) The information processing apparatus according to any one of (1) to (3), in which
the determination section determines the movement of the user on the basis of a speckle pattern included in the information regarding a speckle.

(5) The information processing apparatus according to (4), in which
the determination section determines the movement of the user on the basis of a time-series change in the speckle pattern.

(6) The information processing apparatus according to (5), in which
the determination section determines the movement of the user on the basis of periodicity of the time-series change in the speckle pattern.

(7) The information processing apparatus according to any one of (1) to (6), in which
the body site is a wrist, and
the determination section determines a movement of a hand of the user.

(8) The information processing apparatus according to (7), in which the determination section determines at least one of which finger is flexed, a flexing amount of the flexed finger, an interaction between fingers, or an interaction between a finger and another object.

(9) The information processing apparatus according to any one of (1) to (8), further including an execution section that performs a process corresponding to the determined movement.

(10) The information processing apparatus according to (9), in which the execution section identifies an operation input by the user on the basis of the determined movement, and performs a process corresponding to the identified operation.

(11) The information processing apparatus according to (10), further including a history information storage that stores therein history information regarding an operation input by the user in times past, in which the execution section identifies an operation input by the user on the basis of the stored history information.

(12) The information processing apparatus according to (10) or (11), further including a display section that is capable of displaying a specified graphical user interface (GUI), in which the execution section identifies an operation that is input into the displayed specified GUI, on the basis of the determined movement.

(13) The information processing apparatus according to (12), in which the execution section selects a plurality of selection candidates selectable by the user, on the basis of the determined movement, and the display section displays a selection image that includes the plurality of selected selection candidates.

(14) The information processing apparatus according to any one of (1) to (13), in which the determination section determines the movement of the user in accordance with a specified learning algorithm.

(15) The information processing apparatus according to any one of (1) to (14), further including:

an instruction section that instructs the user to perform a specified movement; and a determination information storage that stores therein determination information that includes the information regarding a speckle, the information regarding a speckle being included in the plurality of detection signals and being information when the user performs the specified movement that has been instructed to be performed, in which the determination section determines the movement of the user on the basis of the stored determination information.

(16) The information processing apparatus according to any one of (1) to (15), further including a reception section that receives right-or-wrong information regarding whether a result of the determination performed by the determination section is right, in which the determination section determines the movement of the user on the basis of the received right-or-wrong information.

(17) The information processing apparatus according to (1), in which the detector includes an image sensor, and the plurality of light detectors is a plurality of pixels of the image sensor.

(18) An information processing apparatus, including:

a receiver that receives a plurality of detection signals output on the basis of reflected light that is reflected off a body site of a user due to light being irradiated onto the body site of the user; and a determination section that determines a movement of the user on the basis of information regarding a speckle generated due to the light being irradiated onto the body site, the information regarding a speckle being included in the plurality of received detection signals.

(19) An information processing method, including:

receiving, by a computer system, a plurality of detection signals output on the basis of reflected light that is reflected off a body site of a user due to light being irradiated onto the body site of the user; and determining, by the computer system, a movement of the user on the basis of information regarding a speckle generated due to the light being irradiated onto the body site, the information regarding a speckle being included in the plurality of received detection signals.

(20) A program that causes a computer system to perform a process including:

receiving a plurality of detection signals output on the basis of reflected light that is reflected off a body site of a user due to light being irradiated onto the body site of the user; and determining a movement of the user on the basis of information regarding a speckle generated due to the light being irradiated onto the body site, the information regarding a speckle being included in the plurality of received detection signals.

REFERENCE SIGNS LIST

L laser light
L1 reflected light
2 wrist
10 main body
11 attachment belt
12 controller
19 storage
21 light source section
22 PD array sensor
26 PD
30 speckle signal receiver
31 speckle signal analyzer
32 movement determination section
33 operation identification section
34 processing performing section
35 speckle signal pattern analyzer
36 time-series speckle signal analyzer
40 selection image
45 instruction processing performing section
46 training data generator
100, 100' wearable apparatus

The invention claimed is:

1. An information processing apparatus, comprising:
a light source section configured to irradiate light onto a body site of a user;
a detector that includes a plurality of light detectors, wherein
the plurality of light detectors is configured to output a plurality of detection signals, and
the plurality of detection signals is based on the light that is reflected off the body site; and
a determination section configured to determine a movement of the user based on a speckle pattern that includes a plurality of speckles, wherein
the plurality of speckles is generated due to the irradiation of the light onto the body site,
the speckle pattern corresponds to distribution of intensity of the plurality of detection signals, and the intensity of the plurality of detection signals is based on differences in skin surface deformation of the body site that occur due to a frequency of vibration of muscles or tendons associated with the body site.

2. The information processing apparatus according to claim 1, wherein the light source section is further configured to irradiate laser light onto the body site.

3. The information processing apparatus according to claim 1, wherein the plurality of light detectors is a plurality of photodiodes.

4. The information processing apparatus according to claim 1, wherein
the determination section is further configured to determine the movement of the user based on a time-series change in the speckle pattern, and
the time-series change in the speckle pattern corresponds to a time-series change in the intensity of the plurality of detection signals.

5. The information processing apparatus according to claim 4, wherein the determination section is further configured to determine the movement of the user based on a periodicity of the time-series change in the speckle pattern.

6. The information processing apparatus according to claim 1, wherein
the body site is a wrist, and
the determination section is further configured to determine the movement of a hand of the user.

7. The information processing apparatus according to claim 6, wherein the determination section is further configured to determine at least one of which finger is flexed, a flexion amount of the flexed finger, an interaction between fingers, or an interaction between a finger and an object.

8. The information processing apparatus according to claim 1, further comprising an execution section configured to perform a process corresponding to the determined movement.

9. The information processing apparatus according to claim 8, wherein the execution section is further configured to:
identify, based on the determined movement, an operation that is input by the user, and
perform a process corresponding to the identified operation.

10. The information processing apparatus according to claim 9, further comprising a history information storage configured to store history information associated with the operation that is input by the user in a past time, wherein
the execution section is further configured to identify, based on the stored history information, the operation that is input by the user.

11. The information processing apparatus according to claim 9, further comprising a display section configured to display a graphical user interface (GUI), wherein
the execution section is further configured to identify, based on the determined movement, the operation that is input into the displayed GUI.

12. The information processing apparatus according to claim 11, wherein
the execution section is further configured to select, based on the determined movement, a plurality of selection candidates selectable by the user, and
the display section is further configured to display a selection image that includes the selected plurality of selection candidates.

13. The information processing apparatus according to claim 1, wherein the determination section is further configured to determine the movement of the user based on a specified learning algorithm.

14. The information processing apparatus according to claim 1, further comprising:
an instruction section configured to instruct the user to perform a specified movement; and
a determination information storage configured to store determination information that includes information associated with the plurality of speckles and information related to when the user performs the instructed specified movement, wherein
the information associated with the plurality of speckles is included in the plurality of detection signals, and
the determination section is further configured to determine the movement of the user based on the stored determination information.

15. The information processing apparatus according to claim 1, further comprising a reception section configured to receive right-or-wrong information based on a result of the determination performed by the determination section is right or wrong, wherein
the determination section is further configured to determine the movement of the user based on the received right-or-wrong information.

16. The information processing apparatus according to claim 1, wherein
the detector includes an image sensor, and
the plurality of light detectors is a plurality of pixels of the image sensor.

17. An information processing apparatus, comprising:
a receiver configured to receive a plurality of detection signals outputted based on light that is reflected off a body site of a user, wherein the light is reflected due to irradiation of the light onto the body site of the user; and
a determination section configured to determine a movement of the user based on a speckle pattern that includes a plurality of speckles, wherein
the plurality of speckles is generated due to the irradiation of the light onto the body site,
the speckle pattern corresponds to distribution of intensity of the plurality of detection signals, and
the intensity of the plurality of detection signals is based on differences in skin surface deformation of the body site that occur due to a frequency of vibration of muscles or tendons associated with the body site.

18. An information processing method, comprising:
receiving, by a computer system, a plurality of detection signals outputted based on light that is reflected off a body site of a user, wherein the light is reflected due to irradiation of the light onto the body site of the user; and
determining, by the computer system, a movement of the user based on a speckle pattern that includes a plurality of speckles, wherein
the plurality of speckles is generated due to the irradiation of the light onto the body site,
the speckle pattern corresponds to distribution of intensity of the plurality of detection signals, and
the intensity of the plurality of detection signals is based on differences in skin surface deformation of the body site that occur due to a frequency of vibration of muscles or tendons associated with the body site.

19. A non-transitory computer-readable medium having stored thereon, computer-executable instructions which, when executed by a computer, cause the computer to execute operations, the operations comprising:
  receiving a plurality of detection signals outputted based on light that is reflected off a body site of a user, wherein the light is reflected due to irradiation of the light onto the body site of the user; and
  determining a movement of the user based on a speckle pattern that includes a plurality of speckles, wherein
    the plurality of speckles is generated due to the irradiation of the light onto the body site,
    the speckle pattern corresponds to distribution of intensity of the plurality of detection signals, and
    the intensity of the plurality of detection signals is based on differences in skin surface deformation of the body site that occur due to a frequency of vibration of muscles or tendons associated with the body site.

* * * * *